US008353803B2

(12) United States Patent
Saitoh

(10) Patent No.: US 8,353,803 B2
(45) Date of Patent: Jan. 15, 2013

(54) AUTOMATIC TRANSMISSION

(75) Inventor: Noriaki Saitoh, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 702 days.

(21) Appl. No.: 12/535,961

(22) Filed: Aug. 5, 2009

(65) Prior Publication Data

US 2010/0035718 A1    Feb. 11, 2010

(30) Foreign Application Priority Data

Aug. 7, 2008  (JP) ................... 2008-204798
Sep. 1, 2008  (JP) ................... 2008-223702
Sep. 5, 2008  (JP) ................... 2008-228294

(51) Int. Cl.
*F16H 37/02* (2006.01)
*F16H 3/44* (2006.01)

(52) U.S. Cl. ........ 475/302; 475/214; 475/219; 475/311; 475/323

(58) Field of Classification Search .................. 475/214, 475/219, 218, 276–292, 302, 303, 311–313, 475/317–319, 323–325
See application file for complete search history.

(56) References Cited

U.S. PATENT DOCUMENTS

| | | | | |
|---|---|---|---|---|
| 3,487,723 A | * | 1/1970 | Piot | 475/276 |
| 7,291,085 B2 | * | 11/2007 | Park | 475/280 |
| 7,819,772 B2 | * | 10/2010 | Tenberge | 475/275 |
| 8,113,978 B2 | * | 2/2012 | Phillips et al. | 475/210 |
| 2005/0181906 A1 | * | 8/2005 | Park | 475/275 |
| 2011/0124456 A1 | * | 5/2011 | Sung | 475/35 |
| 2011/0124458 A1 | * | 5/2011 | Sung | 475/71 |

FOREIGN PATENT DOCUMENTS

JP  2001-32889 A   2/2001
JP  2003-240068 A  8/2003

OTHER PUBLICATIONS

Japanese Office Action dated Jul. 31, 2012, issued in corresponding Japanese Patent Application No. 2008-223702, (2 pages).

* cited by examiner

*Primary Examiner* — Tisha Lewis
(74) *Attorney, Agent, or Firm* — Westerman, Hattori, Daniels & Adrian, LLP

(57) ABSTRACT

An automatic transmission excelling in transmission efficiency than the prior art is provided. The automatic transmission is equipped with an input shaft 2 and an output shaft 3 and a plurality of planetary gear mechanisms 5, 6. Any one element Sa of a plurality of the planetary gear mechanisms 5, 6 is coupled to the input shaft 2. One element Ca is coupled to the output shaft 3 via the first gear row G1. One element Rb is connected to the output shaft 3 via a second gear row G2 having a gear ratio different from that of the first gear row G1. Five or more engagement mechanisms C1 through C3, B1, B2 for coupling each element Ra and Cb, each element Sb, Cb with the input shaft 2, and each element Sb, Cb with the transmission case 1 releasably.

5 Claims, 23 Drawing Sheets

| Pos | C1 | C2 | C3 | B1 | B2 | RATIO | COMMON RATIO | RATIO RANGE |
|---|---|---|---|---|---|---|---|---|
| 1 | | | ○ | | ○ | 4.356 | – | |
| 2 | | | ○ | ○ | | 2.691 | 1.619 | |
| 3 | ○ | | ○ | | | 1.739 | 1.548 | |
| 4 | | ○ | ○ | | | 1.320 | 1.317 | 6.018 |
| 5 | ○ | ○ | | | | 0.950 | 1.389 | |
| 6 | | ○ | | ○ | | 0.724 | 1.313 | |
| R | ○ | | | | ○ | −3.040 | −69.8% | |

| Pos | C1 | C2 | C3 | B1 | B2 | B3 |
|---|---|---|---|---|---|---|
| 1 | | | ○ | | ○ | |
| 2 | | | ○ | | | ○ |
| 3 | | | ○ | ○ | | |
| 4 | ○ | | ○ | | | |
| 5 | | ○ | ○ | | | |
| 6 | ○ | ○ | | | | |
| 7 | | ○ | | ○ | | |
| 8 | | ○ | | | | ○ |
| R | ○ | | | | ○ | |

| Pos | C1 | C2 | B1 | B2 | B3 | F1 | RATIO | COMMON RATIO | RATIO RANGE |
|---|---|---|---|---|---|---|---|---|---|
| 1 | ○ | | (○) | | | ○ | 4.015 | – | |
| 2 | ○ | | | | ○ | | 2.295 | 1.750 | |
| 3 | ○ | | | ○ | | | 1.417 | 1.620 | |
| 4 | ○ | ○ | | | | | 1.100 | 1.288 | 6.185 |
| 5 | | ○ | | ○ | | | 0.847 | 1.298 | |
| 6 | | ○ | | | ○ | | 0.649 | 1.305 | |
| R | | | ○ | ○ | | | -2.775 | -69.1% | |

FIG.21
MESHED TRANSMISSION EFFICIENCY (%)
|   | PRIOR ART | FOURTEENTH EMBODIMENT | | SEVENTEENTH EMBODIMENT | |
|---|---|---|---|---|---|
| 1 | 97.8 | 97.8 | 0.00 | 97.8 | 0.00 |
| 2 | 97.9 | 97.6 | -0.30 | 97.6 | -0.30 |
| 3 | 98.1 | 98.7 | 0.60 | 99.0 | 0.90 |
| 4 | 100.0 | 100.0 | 0.00 | 100.0 | 0.00 |
| 5 | 97.7 | 98.9 | 1.20 | 99.1 | 1.40 |
| 6 | 97.0 | 98.9 | 1.90 | 98.9 | 1.90 |
| AVERAGE | 98.08 | 98.65 | 0.57 | 98.73 | 0.65 |
FIG.22
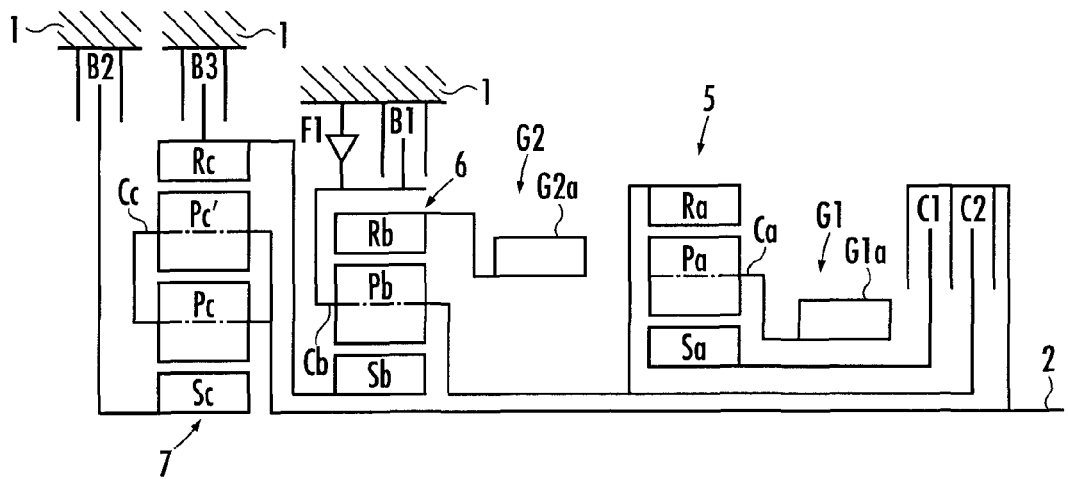
FIG.23
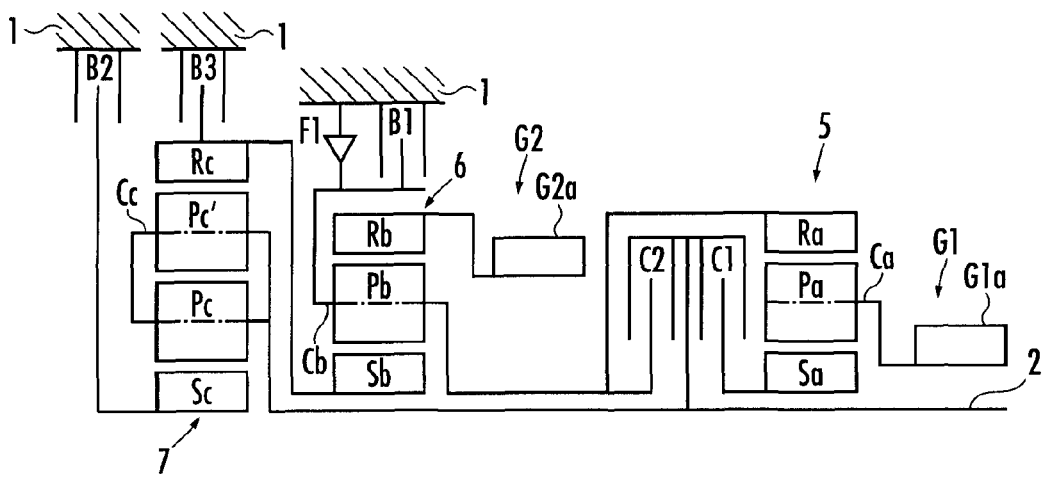

| Pos | C1 | C2 | B1 | B2 | B3 | F1 | RATIO | COMMON RATIO | RATIO RANGE |
|---|---|---|---|---|---|---|---|---|---|
| 1 | O | | (O) | | | O | 4.015 | — | |
| 2 | O | | | | O | | 2.295 | 1.750 | |
| 3 | O | | | O | | | 1.417 | 1.620 | |
| 4 | O | O | | | | | 1.100 | 1.288 | 6.185 |
| 5 | | O | | O | | | 0.847 | 1.298 | |
| 6 | | O | | | O | | 0.649 | 1.305 | |
| R | | | O | O | | | −2.775 | −69.1% | |

| Pos | C1 | C2 | C3 | B1 | B2 | B3 | F1 |
|---|---|---|---|---|---|---|---|
| 1 | ○ | | | (○) | | | ○ |
| 2 | ○ | | | | | ○ | |
| 3 | ○ | | | | ○ | | |
| 4 | ○ | | ○ | | | | |
| 5 | ○ | ○ | | | | | |
| 6 | | ○ | ○ | | | | |
| 7 | | ○ | | | ○ | | |
| 8 | | ○ | | | | ○ | |
| R | | | | ○ | ○ | | |

AUTOMATIC TRANSMISSION

BACKGROUND OF THE INVENTION

1. Field of the Invention

The present invention relates to an automatic transmission which transmits rotation of an input shaft to an output member via a plurality of planetary gear mechanisms arranged concentric to the input shaft and by carrying out gear changes in a plurality of gears.

2. Description of the Related Art

Conventionally, as this type of an automatic transmission, there is known a one from the Japanese Patent Laid-Open No. 2003-240068 (FIG. 4) which uses three, that is, a first to third planetary gear mechanisms arranged concentric to the input shaft and five engagement mechanisms in order to carry out gear changes in six speeds in the forward direction.

In this type of automatic transmission, the first planetary gear mechanism and the second planetary gear mechanism are configured from a single pinion type. The third planetary gear mechanism is configured from a double pinion type. And, a sun gear of the first planetary gear mechanism is coupled to the input shaft.

A ring gear of each of the second planetary gear mechanism and the third planetary gear mechanism are configured from the same member. A pinion which is supported by a carrier of the second planetary gear mechanism is configured from one of a pair of pinions of the third planetary gear mechanism. The carrier of the second planetary gear mechanism and the carrier of the third planetary gear mechanism are coupled together. By coupling the ring gears together and the carriers together, the second and the third planetary gear mechanisms configure a compound planetary gear mechanism. The compound planetary gear mechanism is equipped with four, that is, a first to fourth rotational elements.

The first rotational element is configured from a sun gear of the third planetary gear mechanism. The second rotational element is configured from the ring gear of the second planetary gear mechanism which is common with the ring gear of the third planetary gear mechanism. The third rotational element is configured from the carrier of the second planetary gear mechanism and the carrier of the third planetary gear mechanism which are coupled together. The fourth rotational element is configured from the sun gear of the second planetary gear mechanism.

The first through fourth rotational elements are arranged in order with spaces corresponding to gear ratios in a velocity diagram therebetween. And, the first rotational element is coupled to a carrier of the first planetary gear mechanism, and the third rotational element is coupled to the output member.

Further, the automatic transmission is equipped with, as an engagement mechanism, a total of five engagement mechanisms, namely, two clutches, those are, a first clutch and a second clutch, and three brakes, those are, a first through third brakes. The first clutch couples the fourth rotational element and the input shaft releasably. The second clutch couples the second rotational element with the input shaft releasably. The first brake fixes the first rotational element to the transmission case releasably. The second brake fixes the second rotational element to the transmission case releasably. The third brake fixes the ring gear of the first planetary gear mechanism to the transmission case releasably.

With the above configuration, a first gear speed is established by engaging the first clutch and the second brake. A second gear speed is established by engaging the first clutch and the first brake. A third gear speed is established by engaging the first clutch and the third brake. A fourth gear speed is established by engaging the first clutch and the second clutch. A fifth gear speed is established by engaging the second clutch and the third brake. A sixth gear speed is established by engaging the second clutch and the first brake.

SUMMARY OF THE INVENTION

When a meshed transmission efficiency in the above-mentioned prior art is obtained, it is 97.8% in the first gear speed, 97.9% in the second gear speed, 98.1% in the third gear speed, 100% in the fourth gear speed, 97.7% at the fifth gear speed, 97.0% at the sixth gear speed, and the average of the forward gear speeds is 98.1%.

An object of the present invention is to provide an automatic transmission excelling in transmission efficiency than in the prior art.

The present invention has been made in view of the above object, and provides an automatic transmission which transmits rotation of an input shaft to an output member via a plurality of planetary gear mechanisms arranged concentric to the input shaft and by carrying out gear changes in a plurality of speeds, wherein: a plurality of the planetary gear mechanisms are each equipped with three elements comprised of a sun gear, a carrier, and a ring gear; any one of the elements of a plurality of the planetary gear mechanisms is coupled to the input shaft; the element other than the element coupled to the input shaft is coupled to an output shaft as the output member arranged in parallel to the input shaft via a first gear row, and the element other than the element coupled to the input shaft and other than the element coupled to the output shaft via the first gear row is coupled to the output shaft via a second gear row differing in gear ratio from the first gear row; and the automatic transmission includes five or more of engagement mechanisms which releasably couples each of the elements with each of the elements, each of the elements with the input shaft, and each of the elements with the transmission case, respectively.

According to the present invention, as is apparent from the explanation of the preferred embodiments discussed later, it is possible to carry out gear changes in six speeds in the forward direction as well as improve transmission efficiency than the prior art.

In the first aspect of the present invention, a first planetary gear mechanism and a second planetary gear mechanism are equipped as a plurality of the planetary gear mechanisms, and a first through fifth engagement mechanisms are equipped as the engagement mechanism, the three elements comprised of the sun gear, the carrier and the ring gear of the first planetary gear mechanism are taken in the order of the distance corresponding to a gear ratio in a velocity diagram as a first element, a second element and a third element, respectively, and the three elements comprised of the sun gear, the carrier and the ring gear of the second planetary gear mechanism are taken in the order of the distance corresponding to the gear ratio in the velocity diagram as a fourth element, a fifth element and a sixth element, respectively, the first element is coupled to the input shaft, the second element is coupled to the output shaft via the first gear row, and the sixth element is coupled to the output shaft via the second gear row, the first engagement mechanism couples the fourth element with the input shaft releasably, the second engagement mechanism couples the fifth element with the input shaft releasably, the third engagement mechanism couples the third element with the fifth element releasably, the fourth engagement mechanism fixes the fourth element to the transmission case releasably, and the fifth engagement mechanism fixes the fifth element to the transmission case releasably.

According to the first aspect of the present invention, as is apparent from the explanation of the preferred embodiments discussed later, it is possible to carry out change in six gears in the forward direction. Further, in gear speeds other than the second gear speed and the third gear speed, power transmission is carried out solely by either one planetary gear mechanism of the first and the second planetary gear mechanisms. In the fourth gear speed and the fifth gear speed, the first planetary gear mechanism and the second planetary gear mechanism are in a locked state, respectively. As such, in the fourth gear speed and the fifth gear speed, the meshed transmission efficiency becomes 100%. Therefore, the transmission efficiency of the overall automatic transmission is improved.

Further, in the first aspect of the present invention, the first element is the sun gear of the first planetary gear mechanism, a third planetary gear mechanism having a ring gear which is united with the sun gear of the first planetary gear mechanism is arranged at an inner side in the diameter direction of the first planetary gear mechanism, the carrier of the third planetary gear mechanism is coupled to the fourth element, and the automatic transmission comprises a sixth engagement mechanism which fixes the sun gear of the third planetary gear mechanism to the transmission case releasably. By doing so, it is possible to carry out gear changes in forward 8 speeds.

In the first aspect of the present invention, the sixth element is the ring gear of the second planetary gear mechanism, a third planetary gear mechanism having a sun gear which is united with the ring gear of the second planetary gear mechanism is arranged at an outer side in the diameter direction of the second planetary gear mechanism, the carrier of the third planetary gear mechanism is coupled to the fourth element, and the automatic transmission comprises a sixth engagement mechanism which fixes the ring gear of the third planetary gear mechanism to the transmission case releasably. By doing so, it is also possible to carry out gear changes in forward 8 speeds.

In the first aspect of the present invention, the fourth element is the sun gear of the second planetary gear mechanism, a third planetary gear mechanism having a ring gear which is united with the sun gear of the second planetary gear mechanism is arranged at an inner side in the diameter direction of the second planetary gear mechanism, the sun gear of the third planetary gear mechanism is coupled to the input shaft, and the automatic transmission comprises a sixth engagement mechanism which fixes the carrier of the third planetary gear mechanism to the transmission case releasably. By doing so, it is also possible to carry out gear changes in forward 8 speeds.

In the first aspect of the present invention, the first engagement mechanism may couple the carrier of the third planetary gear mechanism with the input shaft releasably. In this case, when the first engagement mechanism is in the condition of coupling the carrier of the third planetary gear mechanism with the input shaft, the rotational speed of the sun gear of the third planetary gear mechanism becomes equal to the rotational speed of the carrier thereof. By doing so, each element of the third planetary gear mechanism is in the locked state incapable of rotating relatively.

Then, the rotational speed of the sun gear of the second planetary gear mechanism which is united with the ring gear of the third planetary gear mechanism becomes equal to the rotational speed of the input shaft. Therefore, the first engagement mechanism functions as a mechanism which is capable of switching between the state of coupling the sun gear as the fourth element of the second planetary gear mechanism with the input shaft and the state of releasing the coupled state.

Further, in any of the automatic transmission according to the first aspect of the present invention in which the third planetary gear mechanism is added, the third planetary gear is arranged at an inner or outer side in the diameter direction of one of the planetary gear mechanism out of the first and the second planetary gear mechanisms, so that the shaft length of the transmission is not increased even though the same is provided with the gear change ability of forward 8 speeds.

In a second aspect of the present invention, a first planetary gear mechanism and a second planetary gear mechanism are equipped as a plurality of the planetary gear mechanisms, and the first through fifth engagement mechanisms are equipped as the engagement mechanism, the three elements comprised of the sun gear, the carrier and the ring gear of the first planetary gear mechanism are taken in the order of the distance corresponding to a gear ratio in a velocity diagram as a first element, a second element and a third element, respectively, and the three elements comprised of the sun gear, the carrier and the ring gear of the second planetary gear mechanism are taken in the order of the distance corresponding to the gear ratio in the velocity diagram as a fourth element, a fifth element and a sixth element, respectively, the third element and the fourth element are coupled together to configure a coupled body, the second element is coupled to the output shaft via the first gear row, and the fifth element is coupled to the output shaft via the second gear row, the first engagement mechanism couples the first element with the input shaft releasably, the second engagement mechanism couples the coupled body with the input shaft releasably, the third engagement mechanism couples the sixth element with the input shaft releasably, the fourth engagement mechanism fixes the first element to the transmission case releasably, and the fifth engagement mechanism fixes the sixth element to the transmission case releasably.

According to the second aspect of the present invention, as is apparent from the explanation of the preferred embodiments discussed later, it is possible to carry out gear changes in six speeds in the forward direction. And, in the second aspect of the present invention, only two planetary gear mechanisms, those are, the first and the second planetary gear mechanisms aligned in the axial direction is used as the planetary gear mechanism. Therefore, the shaft length of the automatic transmission may be shortened compared to that having three planetary gear mechanisms aligned in the axial direction.

Also, in the gear speeds other than the fifth gear speed, the sixth gear speed, and the reverse gear speed, power transmission is carried out solely by one of the planetary gear mechanism out of the first and the second planetary gear mechanisms. Further, in the third gear speed and the fourth gear speed, the first planetary gear mechanism and the second planetary gear mechanism are in a locked state, respectively. Therefore, the meshed transmission efficiency in the third gear speed and the fourth gear speed become 100%, so that the transmission efficiency of the overall automatic transmission is improved.

Further, in the second aspect of the present invention, when the third element is the ring gear of the first planetary gear mechanism and the fourth element is the sun gear of the second planetary gear mechanism, it is possible to shorten the shaft length of the transmission further by arranging the second planetary gear mechanism at the outer side in the diameter direction of the first planetary gear mechanism, and configuring the coupled body by uniting the ring gear of the first planetary gear mechanism and the sun gear of the second planetary gear mechanism.

According to a third aspect of the present invention, a first through third planetary gear mechanisms are equipped as a plurality of the planetary gear mechanisms, a first through fifth engagement mechanisms are equipped as the engagement mechanism, the three elements comprised of the sun gear, the carrier and the ring gear of the first planetary gear mechanism are taken in the order of the distance corresponding to a gear ratio in a velocity diagram as a first element, a second element and a third element, respectively, the three elements comprised of the sun gear, the carrier and the ring gear of the second planetary gear mechanism are taken in the order of the distance corresponding to the gear ratio in the velocity diagram as a fourth element, a fifth element and a sixth element, respectively, and the three elements comprised of the sun gear, the carrier and the ring gear of the third planetary gear mechanism are taken in the order of the distance corresponding to the gear ratio in the velocity diagram as a seventh element, an eighth element and a ninth element, respectively, the third element and the fifth element are coupled together to configure a first coupled body, the fourth element and the eighth element are coupled together to configure a second coupled body, the ninth element is coupled to the input shaft, the second element is coupled to the output shaft via the first gear row, the sixth element is coupled to the output shaft via the second gear row, the first engagement mechanism couples the first element with the input shaft releasably, the second engagement mechanism couples the first coupled body with the input shaft releasably, the third engagement mechanism fixes the first coupled body with the transmission case releasably, the fourth engagement mechanism fixes the seventh element to the transmission case releasably, and the fifth engagement mechanism fixes the second coupled body with the transmission case releasably.

In the third aspect of the present invention, as is apparent from the explanation of the preferred embodiments discussed later, it is possible to carry out gear change in six speeds in the forward direction. Further, because the transmission efficiency in high gear speeds such as the fifth gear speed and the sixth gear speed, the transmission efficiency of the overall automatic transmission is improved.

Further, in the third aspect of the present invention, it is preferable to comprise a sixth engagement mechanism which couples the second coupled body with the input shaft releasably. By doing so, it is possible to carry out gear changes in forward 8 speeds. Further, in the gear speeds which is established by engaging the first engagement mechanism and the second engagement mechanism, and the gear speeds which is established by engaging the second engagement mechanism and the sixth engagement mechanism, the first planetary gear mechanism or the second planetary gear mechanism is in a locked state. As such, the meshed transmission efficiency of these two speeds becomes 100%. Therefore, the transmission efficiency of the overall automatic transmission is improved.

Further, in the third aspect of the present invention, it may be that either one of the first planetary gear mechanism and the third planetary gear mechanism, and the second planetary gear mechanism are configured from the planetary gear mechanism of a single pinion type, and the other one of the first planetary gear mechanism and the third planetary gear mechanism is configured from the planetary gear mechanism of a double pinion type. Moreover, all of the first through third planetary gear mechanisms may be configured from the planetary gear mechanism of the single pinion type. By using the planetary gear mechanism of the single pinion type, it is possible to reduce the number of meshed engagement. Therefore, it is possible to improve the transmission efficiency further.

BRIEF DESCRIPTION OF THE DRAWINGS

FIG. 21 is a table indicating the meshed transmission efficiency of each gear speed in the fourteenth and the seventeenth embodiment;

FIG. 22 is a skeletal view of the automatic transmission according to a fifteenth embodiment of the present invention;

FIG. 23 is a skeletal view of the automatic transmission according to a sixteenth embodiment of the present invention;

DESCRIPTION OF THE PREFERRED EMBODIMENT

Figure 1:
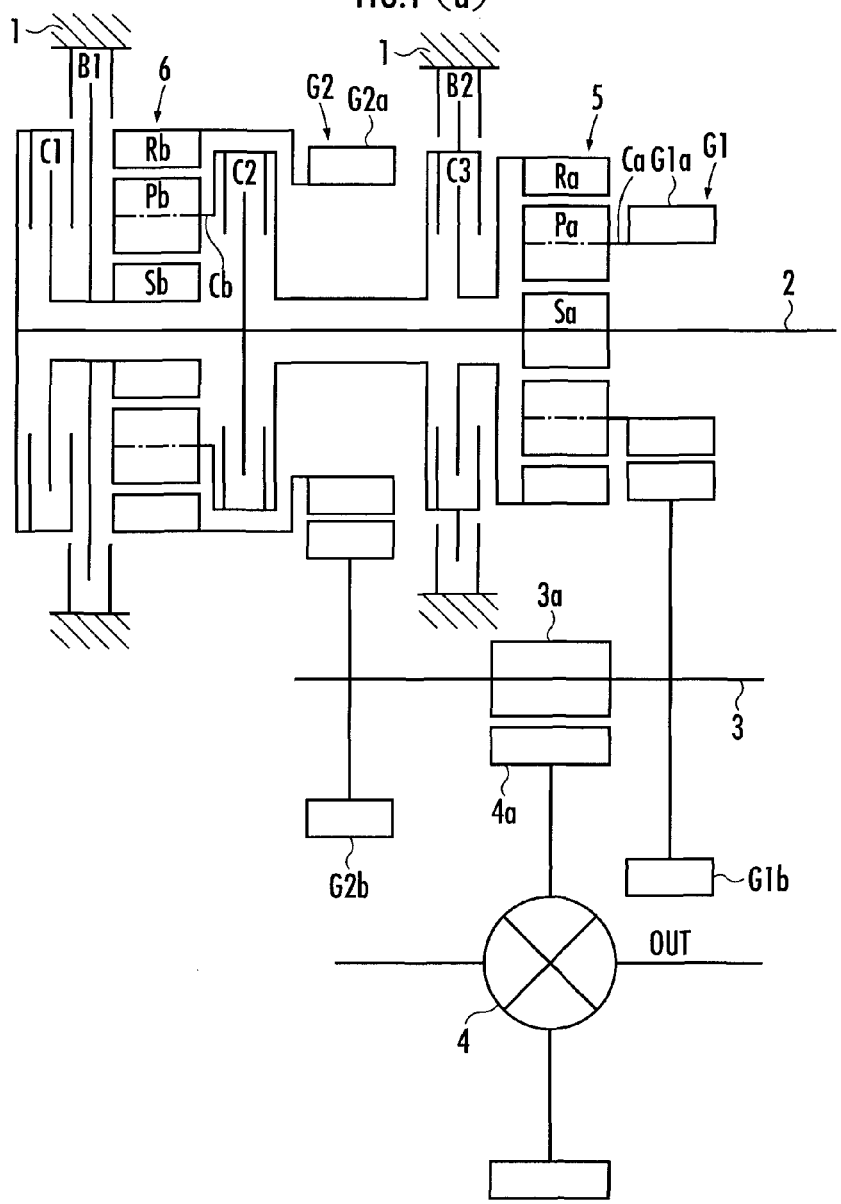
FIG. 1(a) is a skeletal view of an automatic transmission according to a first embodiment of the present invention.
FIG. 1(b) is a table collectively indicating the engagement condition of each engagement mechanism in each gear speed in the first embodiment.

FIG. 1(a) shows a first embodiment of an automatic transmission of the present invention. In the first embodiment, the automatic transmission is equipped with an input shaft 2 axially supported inside a transmission case 1 so that it is rotatable therein and coupled to a driving source such as an engine (not shown), and an output shaft 3 as an output member arranged in parallel to the input shaft 2. The rotation of the output shaft 3 is transmitted to the left and right driving wheels of the vehicle via a differential gear 4 fixed with a final driven gear 4a which is brought into meshed engagement with an output gear 3a fixed to the output shaft 3.

Further, inside the transmission case 1, a first planetary gear mechanism 5 and a second planetary gear mechanism 6 are arranged coaxially with the input shaft 2. The first planetary gear mechanism 5 is configured from a sun gear Sa, a ring gear Ra, a pinion Pa, and a carrier Ca. The pinion Pa is brought into meshed engagement with the sun gear Sa and the ring gear Ra, and is supported by the carrier Ca rotatably and revolvably. That is, the first planetary gear mechanism 5 is configured from a planetary gear mechanism of a single pinion type.

Figure 2:
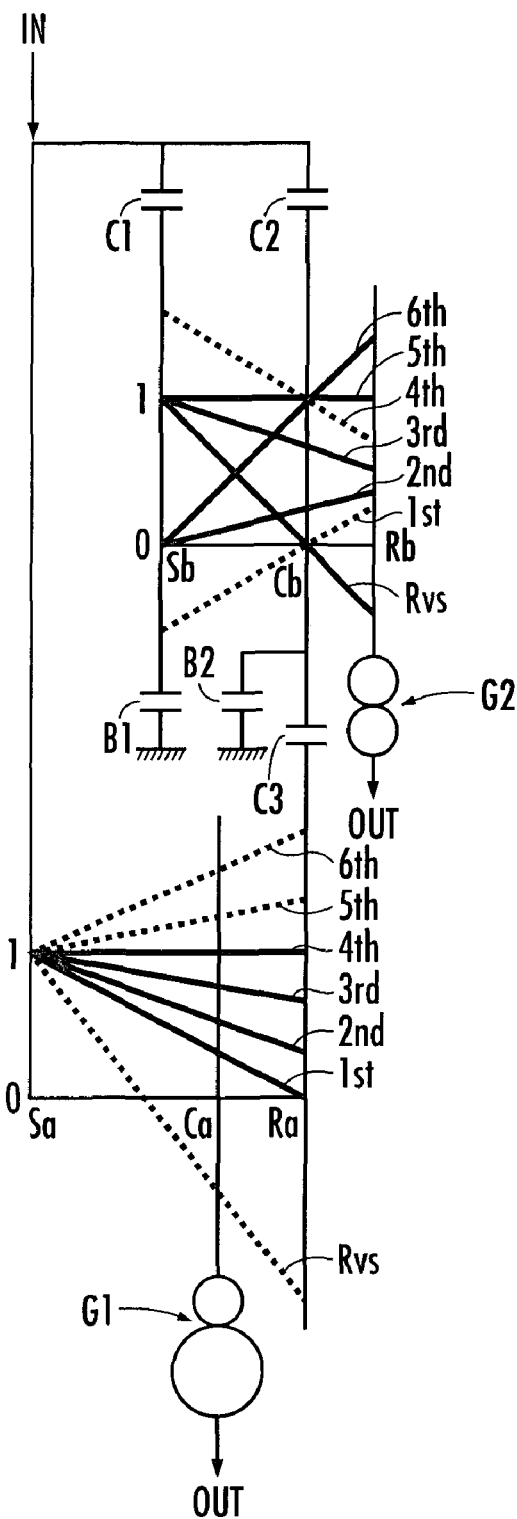
FIG. 2 is a velocity diagram of the first planetary gear mechanism and the second planetary gear mechanism of the first embodiment.

At the bottom of FIG. 2, there is illustrated a velocity diagram of the first planetary gear mechanism 5 (drawing capable of representing the relative relationship among the rotational speeds of the sun gear, the carrier, and the ring gear as straight lines). With reference to the velocity diagram, when three elements comprised of the sun gear Sa, the carrier Ca and the ring gear Ra of the first planetary gear mechanism 5 are taken from the left in the order of the distance corresponding to a gear ratio in the velocity diagram as a first element, a second element, and a third element, respectively, the first element becomes the sun gear Sa, the second element becomes the carrier Ca, and the third element becomes the ring gear Ra.

Here, the ratio of the distance between the sun gear Sa and the carrier Ca and the distance between the carrier Ca and the ring gear Ra is, when taking the gear ratio (number of teeth of the ring gear/number of teeth of the sun gear) of the first planetary gear mechanism 5 as "i", set to i:1. In the velocity diagram, the lower horizontal line and the upper horizontal line respectively indicates a rotational speed of "0" and "1" (rotational speed equal to that of the input shaft 2).

The second planetary gear mechanism 6 is configured from, similarly to the first planetary gear mechanism 5, a sun gear Sb, a ring gear Rb, a pinion Pb, and a carrier Cb. The pinion Pb is brought into meshed engagement with the sun gear Sb and the ring gear Rb, and is supported by the carrier Cb rotatably and revolvably. That is, the second planetary gear mechanism 6 is also configured from a planetary gear mechanism of a single pinion type.

At the top of FIG. 2, there is illustrated a velocity diagram of the second planetary gear mechanism 6. With reference to the velocity diagram, when three elements comprised of the sun gear Sb, the carrier Cb and the ring gear Rb of the second planetary gear mechanism 6 are taken from the left in the order of the distance corresponding to a gear ratio in the velocity diagram as a fourth element, a fifth element, and a sixth element, respectively, the fourth element becomes the sun gear Sb, the fifth element becomes the carrier Cb, and the sixth element becomes the ring gear Rb. The ratio of the distance between the sun gear Sb and the carrier Cb and the distance between the carrier Cb and the ring gear Rb is, when taking the gear ratio of the second planetary gear mechanism 6 as "j", set to j:1.

The sun gear Sa (the first element) of the first planetary gear mechanism 5 is coupled to the input shaft 2. The carrier Ca (the second element) of the first planetary gear mechanism 5 is coupled to the output shaft 3 via a first gear row G1 comprised of a driving gear G1a fixed to the carrier Ca and a driven gear G1b fixed to the output shaft 3 and brought into meshed engagement with the driving gear G1a. The ring gear Rb (the sixth element) of the second planetary gear mechanism 6 is coupled to the output shaft 3 via a second gear row G2 comprised of a driving gear G2a fixed to the ring gear Rb and a driven gear G2b fixed to the output shaft 3 and brought into meshed engagement with the driving gear G2a.

Here, when the gear ratio (number of teeth of the driven gear/number of teeth of the driving gear) of the first gear row G1 is taken as p, the gear ratio of the second gear row G2 is taken as q, it is set to become p>q. Further, the carrier Ca of the first planetary gear mechanism 5 and the ring gear Rb of the second planetary gear mechanism 6 are coupled to the output shaft 3 via both gear rows G1 and G2. As such, the ring gear Rb of the second planetary gear mechanism 6 rotates at the speed of q/p of the rotational speed of the carrier Ca of the first planetary gear mechanism 5.

In the first embodiment, the automatic transmission is equipped with five engagement mechanisms, i.e., a first clutch C1 as a first engagement mechanism, a second clutch C2 as a second engagement mechanism, a third clutch C3 as a third engagement mechanism, a first brake B1 as a fourth engagement mechanism, and a second brake B2 as a fifth engagement mechanism.

The first clutch C1 couples the sun gear Sb (the fourth element) of the second planetary gear mechanism 6 with the input shaft 2 releasably. The second clutch C2 couples the carrier Cb (the fifth element) of the second planetary gear mechanism 6 with the input shaft 2 releasably. The third clutch C3 couples the ring gear Ra (the third element) of the first planetary gear mechanism 5 with the carrier Cb (the fifth element) of the second planetary gear mechanism 6 releasably.

The first brake B1 fixes the sun gear Sb (the fourth element) of the second planetary gear mechanism 6 to the transmission case 1 releasably. The second brake B2 fixes the carrier Cb (the fifth element) of the second planetary gear mechanism 6 to the transmission case 1 releasably. Each engagement mechanism is controlled by a transmission control unit (TCU) not shown.

In the first embodiment, in order to establish a first gear speed, the TCU engages the third clutch C3 and the second brake B2. By doing so, the rotational speed of the sun gear Sa of the first planetary gear mechanism 5 becomes "1", and the rotational speed of the ring gear Ra of the first planetary gear mechanism 5 becomes "0", so that the velocity line of the first planetary gear mechanism 5 becomes a line indicated by "1st" in FIG. 2. Then, the rotational speed of the carrier Ca of the first planetary gear mechanism 5 becomes $1/(i+1)$, the output shaft 3 rotates at the speed of $1/\{(i+1)p\}$ via the first gear row G1, so that the first gear speed is established.

In order to establish a second gear speed, the TCU engages the third clutch C3 and the first brake B1. By doing so, the rotational speed of the sun gear Sa of the first planetary gear mechanism 5 becomes "1", and the rotational speed of the sun gear Sb of the second planetary gear mechanism 6 becomes "0".

Further, the ring gear Ra of the first planetary gear mechanism 5 and the carrier Cb of the second planetary gear mechanism 6 rotate at a uniform velocity, the ring gear Rb of the second planetary gear mechanism 6 rotates at a speed of q/p the rotational speed of the carrier Ca of the first planetary gear mechanism 5, so that the velocity lines of the first planetary gear mechanism 5 and the second planetary gear mechanism 6 become lines indicated by "2nd" in FIG. 2.

Then, the rotational speed of the carrier Ca of the first planetary gear mechanism 5 becomes $(j+1)p/\{(i+1)(j+1)p-ijq\}$, the rotational speed of the ring gear Rb of the second planetary gear mechanism 6 becomes $(j+1)q/\{(i+1)(j+1)p-ijq\}$, and the output shaft 3 rotates at the speed of $(j+1)/\{(i+1)(j+1)p-ijq\}$, so that the second gear speed is established.

In order to establish a third gear speed, the TCU engages the first clutch C1 and the third clutch C3. By doing so, the rotational speed of the sun gear Sa of the first planetary gear mechanism 5 and the rotational speed of the sun gear Sb of the second planetary gear mechanism 6 both become "1". Further, the ring gear Ra of the first planetary gear mechanism 5 and the carrier Cb of the second planetary gear mechanism 6 rotate at a uniform velocity, the ring gear Rb of the second planetary gear mechanism 6 rotates at a speed of q/p the rotational speed of the carrier Ca of the first planetary gear mechanism 5, so that the velocity lines of the first planetary gear mechanism 5 and the second planetary gear mechanism 6 become lines indicated by "3rd" in FIG. 2.

Then, the rotational speed of the carrier Ca of the first planetary gear mechanism 5 becomes $(i+j+1)p/\{(i+1)(j+1)p-ijq\}$, the rotational speed of the ring gear Rb of the second planetary gear mechanism 6 becomes $(i+j+1)q/\{(i+1)(j+1)p-ijq\}$, and the output shaft 3 rotates at the speed of $(i+j+1)/\{(i+1)(j+1)p-ijq\}$, so that the third gear speed is established.

In order to establish a fourth gear speed, the TCU engages the second clutch C2 and the third clutch C3. By doing so, the rotational speed of the sun gear Sa of the first planetary gear mechanism 5 and the rotational speed of the ring gear Ra of the first planetary gear mechanism 5 both become "1". At this time, the first planetary gear mechanism 5 is in a locked state in which each element is incapable of rotating relatively. Then, the velocity line of the first planetary gear mechanism 5 becomes a line indicated by "4th" in FIG. 2, the rotational speed of the carrier Ca of the first planetary gear mechanism 5 becomes "1", and the output shaft 3 rotates at a speed of 1/p, so that the fourth gear speed is established.

In order to establish a fifth gear speed, the TCU engages the first clutch C1 and the second clutch C2. By doing so, the rotational speed of the sun gear Sb of the second planetary gear mechanism 6 and the rotational speed of the carrier Cb of the second planetary gear mechanism 6 both become "1". At this time, the second planetary gear mechanism 6 is in a locked state in which each element is incapable of rotating relatively. Then, the velocity line of the second planetary gear mechanism 6 becomes a line indicated by "5th" in FIG. 2, the rotational speed of the ring gear Rb of the second planetary gear mechanism 6 becomes "1", and the output shaft 3 rotates at a speed of 1/q, so that the fifth gear speed is established.

In order to establish a sixth gear speed, the TCU engages the second clutch C2 and the first brake B1. By doing so, the rotational speed of the sun gear Sb of the second planetary gear mechanism 6 becomes "0", the rotational speed of the carrier Cb of the second planetary gear mechanism 6 becomes "1", so that the velocity line of the second planetary gear mechanism 6 becomes a line indicated by "6th" in FIG. 2. Then, the rotational speed of the ring gear Rb of the second planetary gear mechanism 6 becomes $(j+1)/j$, and the output shaft 3 rotates at a speed of $(j+1)/(jq)$, so that the sixth gear speed is established.

In order to establish a reverse gear speed, the TCU engages the first clutch C1 and the second brake B2. By doing so, the rotational speed of the sun gear Sb of the second planetary gear mechanism 6 becomes "1", and the rotational speed of the carrier Cb of the second planetary gear mechanism 6 becomes "0", so that the velocity line of the second planetary gear mechanism 6 becomes a line indicated by "Rvs" in FIG. 2. Then, the rotational speed of the ring gear Rb of the second planetary gear mechanism 6 becomes $-1/j$, and the output shaft 3 rotates at a speed of $-1/(jq)$ so that the reverse gear speed is established.

The velocity lines indicated by dotted line in FIG. 2 represents that, of the first and second planetary gear mechanisms 5 and 6, each element of the other planetary gear mechanism is rotating following the one planetary gear mechanism which is conducting power transmission.

FIG. 1(b) is a table collectively indicating the relationship between each of the gear speed and the engagement condition of the clutches C1, C2 and C3, and the brakes B1 and B2 explained above, and "o" represents engagement. Further, FIG. 1(b) shows a gear ratio (the rotational speed of the input shaft 2/the rotational speed of the output shaft 3) of each gear speed, when the gear ratio i of the first planetary gear mechanism 5 is set to 2.30, the gear ratio j of the second planetary gear mechanism 6 is set to 3.20, the gear ratio p of the first gear row G1 is set to 1.32, and the gear ratio q of the second gear row G2 is set to 0.95. According thereto, a common ratio (ratio of the gear ratios between each gear speed) is set appropriately, and as well as a ratio range (the first gear ratio/the sixth gear ratio) is set appropriately.

Further, according to the first embodiment, only two planetary gear mechanisms, i.e., the first and the second planetary gear mechanisms 5 and 6 are used as the planetary gear mechanism. Therefore, it is possible to shorten the shaft length of the transmission, compared to that of the prior art in which three planetary gear mechanisms are used.

Further, in the gear speeds other than the second gear speed and the third gear speed, the power transmission is conducted solely by either one of the first and the second planetary gear mechanisms 5 and 6. Also, in the fourth gear speed and the fifth gear speed, the first planetary gear mechanism 5 and the second planetary gear mechanism 6 are in a locked state, respectively. Therefore, in these gear speeds, the meshed transmission efficiency becomes 100%, so that the transmission efficiency of the overall automatic transmission is improved.

Here, in the automatic transmission of the first embodiment, the planetary gear mechanism of the single pinion type is used in each of the first and the second planetary gear mechanisms 5 and 6. However, in the automatic transmission of the first embodiment, the planetary gear mechanism of a double pinion type may be used in each of the planetary gear mechanisms 5 and 6.

The planetary gear mechanism of the double pinion type is configured from a sun gear, a ring gear, a pair of pinions, and a carrier. The pair of pinions is brought into meshed engagement with each other, as well as one of the pinions is brought into meshed engagement with the sun gear and the other pinion is brought into meshed engagement with the ring gear, and is supported by the carrier rotatably and revolvably.

When the first planetary gear mechanism 5 is configured from the planetary gear mechanism of the double pinion type, either one of the sun gear and the carrier becomes the first element, the ring gear becomes the second element, and the other one of the sun gear and the carrier becomes the third element. Further, when the second planetary gear mechanism 6 is configured from the planetary gear mechanism of the double pinion type, either one of the sun gear and the carrier becomes the fourth element, the ring gear becomes the fifth element, and the other one of the sun gear and the carrier becomes the sixth element.

Further, in the first embodiment, the first gear row G1, the first planetary gear mechanism 5, the third clutch C3 and the second brake B2, the second gear row G2, the second clutch C2, the second planetary gear mechanism 6, the first brake B1, and the first clutch C1 are arranged in this order from one end side around the input shaft 2. However, it is not limited thereto.

Figure 3:
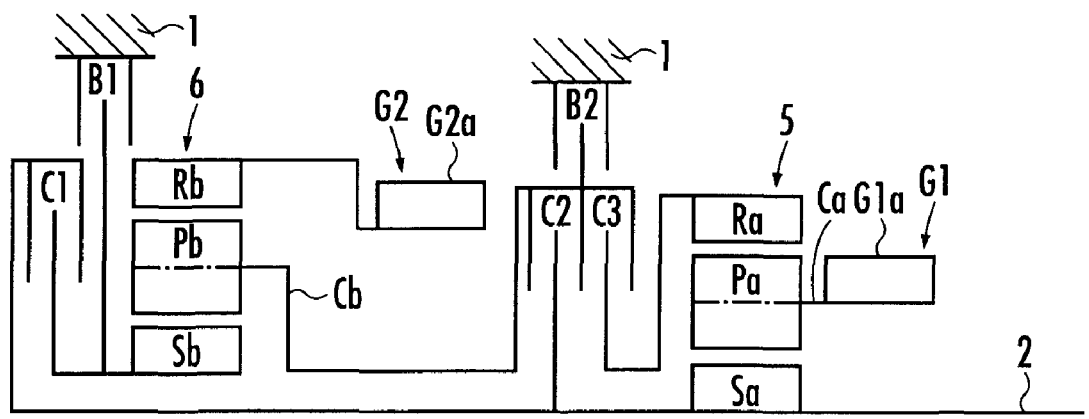
FIG. 3 is a skeletal view of the automatic transmission according to a second embodiment of the present invention.
Figure 4:
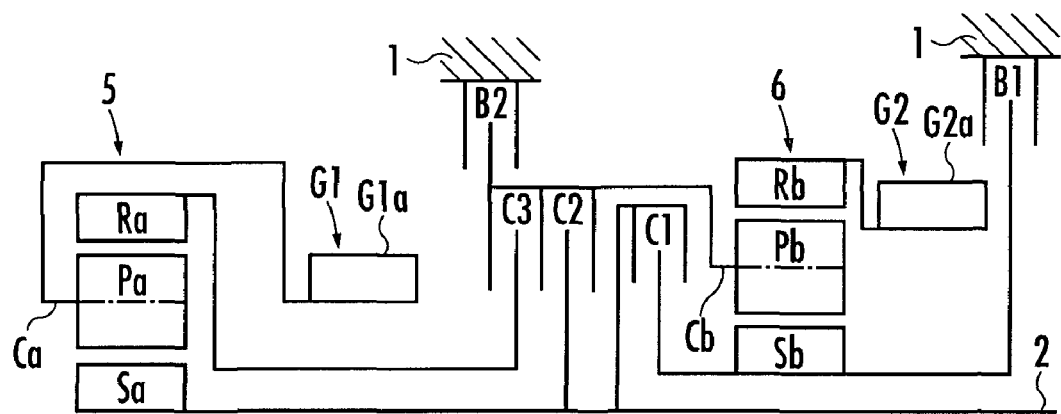
FIG. 4 is a skeletal view of the automatic transmission according to a third embodiment of the present invention.

For example, as in a second embodiment shown in FIG. 3, the third clutch C3, the second clutch C2, and the second brake B2 may be arranged between the first planetary gear mechanism 5 and the second gear row G2. Further, as in a third embodiment shown in FIG. 4, the first brake B1, the second gear row G2, the second planetary gear mechanism 6, the first clutch C1, the second clutch C2, the third clutch C3 and the second brake B2, the first gear row G1, and the first planetary gear mechanism 5 may be arranged in this order from one end side of the input shaft 2. Further, it is also possible to arrange the first gear row G1 and the second gear row G2 between the first planetary gear mechanism 5 and the second planetary gear mechanism 6.

Figure 5:
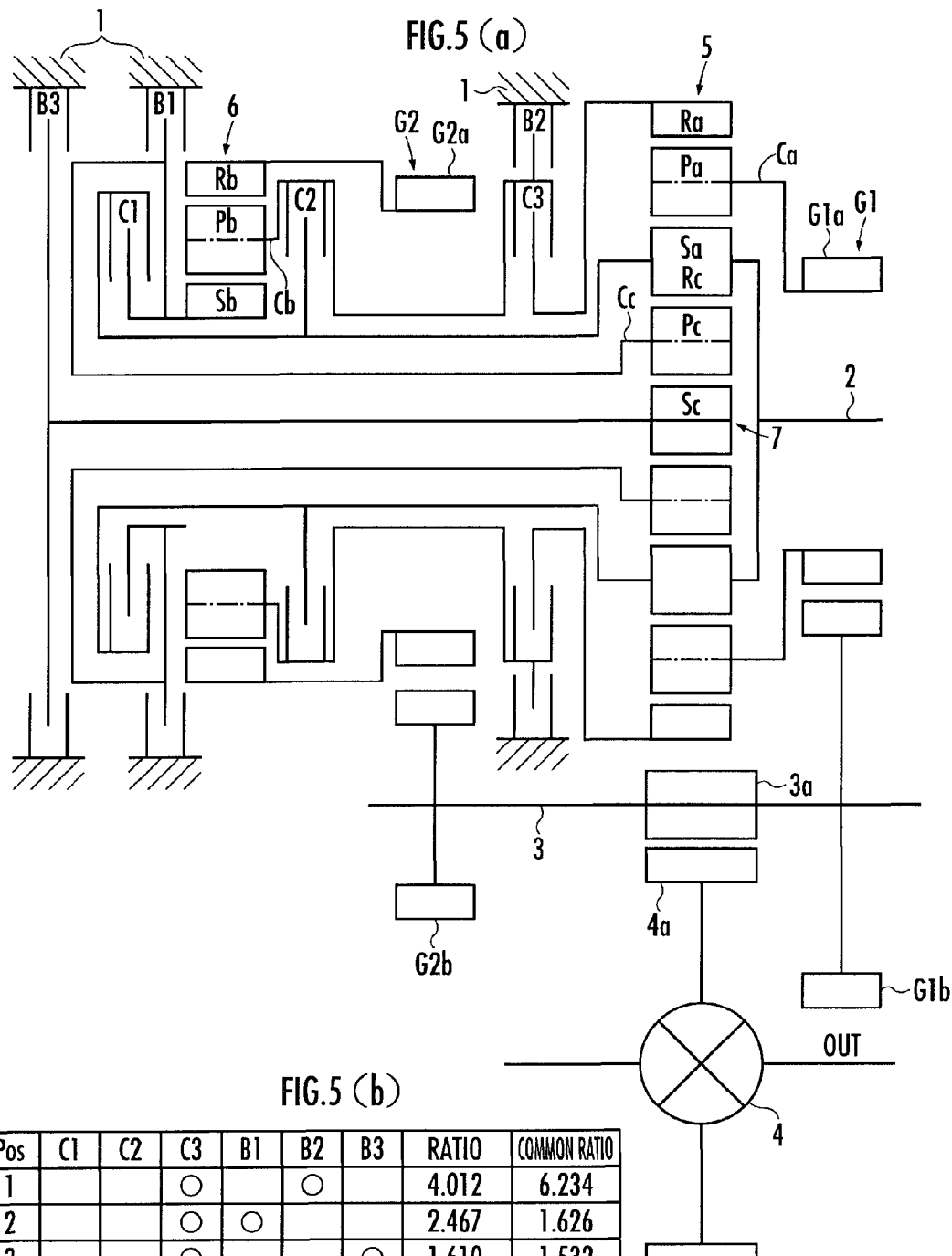
FIG. 5(a) is a skeletal view of the automatic transmission according to a fourth embodiment of the present invention.
FIG. 5(b) is a table collectively indicating the engagement condition of each engagement mechanism in each gear speed in the fourth embodiment.

Next, explanation will be given on a fourth embodiment shown in FIG. 5(*a*). The fourth embodiment is the case where a third planetary gear mechanism 7 is added to the first embodiment mentioned above. The third planetary gear mechanism 7 is configured from a sun gear Sc, a ring gear Rc, a pinion Pc, and a carrier Cc. The pinion Pc is brought into meshed engagement with the sun gear Sc and the ring gear Rc, and is supported by the carrier Cc rotatably and revolvably.

That is, the third planetary gear mechanism 7 is configured from a planetary gear mechanism of a single pinion type.

Further, the sun gear Sa of the first planetary gear mechanism 5 and the ring gear Rc of the third planetary gear mechanism 7 are united together, and the third planetary gear mechanism 7 is arranged at an inner side in the diameter direction of the first planetary gear mechanism 5.

The carrier Cc of the third planetary gear mechanism 7 is coupled to the sun gear Sb of the second planetary gear mechanism 6 as the fourth element. Further, as the engagement mechanism, a third brake B3 as a sixth engagement mechanism which is capable of switching between the state of fixing the sun gear Sc of the third planetary gear mechanism 7 to the transmission case 1 and the state of releasing the fixture is added in this embodiment. The configurations other than those mentioned above are the same as in the first embodiment.

Figure 6:
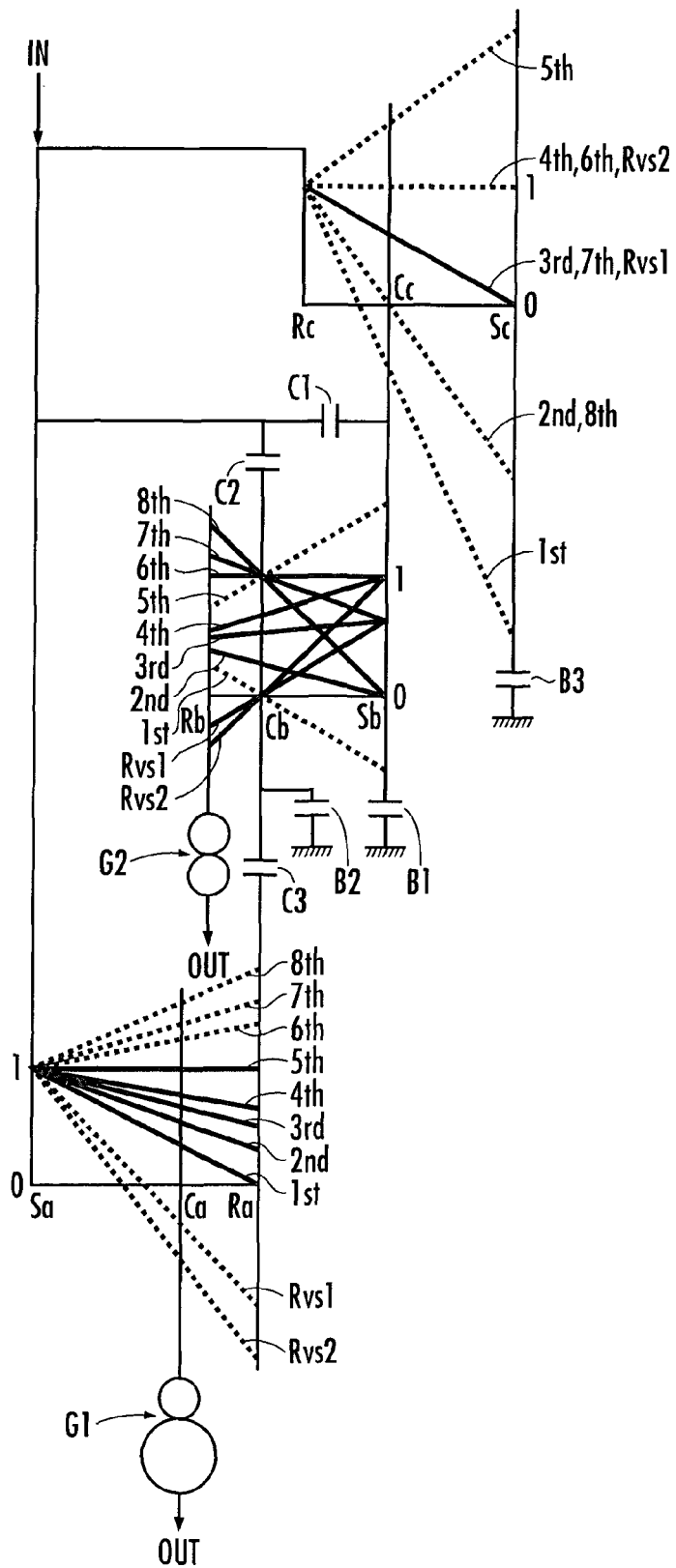
FIG. 6 is a velocity diagram of the first through third planetary gear mechanisms of the fourth embodiment.

At the top of FIG. 6, there is illustrated a velocity diagram of the third planetary gear mechanism 7. With reference to the velocity diagram, the rotational speed of the ring gear Rc of the third planetary gear mechanism 7 is constantly "1". Further, when the third brake B3 is engaged, the rotational speed of the sun gear Sc of the third planetary gear mechanism 7 becomes "0". Therefore, when the gear ratio of the third planetary gear mechanism 7 is taken as k, the rotational speed of the carrier Cc of the third planetary gear mechanism 7 and the sun gear Sb of the second planetary gear mechanism 6 coupled thereto becomes $k/(k+1)$.

In the fourth embodiment, in order to establish a first gear speed, the TCU engages the third clutch C3 and the second brake B2. By doing so, the rotational speed of the sun gear Sa of the first planetary gear mechanism 5 becomes "1", and the rotational speed of the ring gear Ra of the first planetary gear mechanism 5 becomes "0", so that the velocity line of the first planetary gear mechanism 5 becomes a line indicated by "1st" in FIG. 6. Then, the rotational speed of the carrier Ca of the first planetary gear mechanism 5 becomes $1/(i+1)$, the output shaft 3 rotates at the speed of $1/\{(i+1)p\}$ via the first gear row G1, so that the first gear speed is established.

In order to establish a second gear speed, the TCU engages the third clutch C3 and the first brake B1. By doing so, the rotational speed of the sun gear Sa of the first planetary gear mechanism 5 becomes "1", and the rotational speed of the sun gear Sb of the second planetary gear mechanism 6 becomes "0". Further, the ring gear Ra of the first planetary gear mechanism 5 and the carrier Cb of the second planetary gear mechanism 6 rotate at a uniform velocity, the ring gear Rb of the second planetary gear mechanism 6 rotates at a speed of $q/p$ the rotational speed of the carrier Ca of the first planetary gear mechanism 5, so that the velocity lines of the first planetary gear mechanism 5 and the second planetary gear mechanism 6 become lines indicated by "2nd" in FIG. 6.

Then, the rotational speed of the carrier Ca of the first planetary gear mechanism 5 becomes $(j+1)p/\{(i+1)(j+1)p-ijq\}$, the rotational speed of the ring gear Rb of the second planetary gear mechanism 6 becomes $(j+1)q/\{(i+1)(j+1)p-ijq\}$, and the output shaft 3 rotates at the speed of $(j+1)/\{(i+1)(j+1)p-ijq\}$, so that the second gear speed is established.

In order to establish a third gear speed, the TCU engages the third clutch C3 and the third brake B3. By doing so, the rotational speed of the sun gear Sa of the first planetary gear mechanism 5 becomes "1", and the rotational speed of the sun gear Sb of the second planetary gear mechanism 6 becomes $k/(k+1)$. Further, the ring gear Ra of the first planetary gear mechanism 5 and the carrier Cb of the second planetary gear mechanism 6 rotate at a uniform velocity, the ring gear Rb of the second planetary gear mechanism 6 rotates at a speed of $q/p$ the rotational speed of the carrier Ca of the first planetary gear mechanism 5, so that the velocity lines of the first planetary gear mechanism 5, the second planetary gear mechanism 6 and the third planetary gear mechanism 7 become lines indicated by "3rd" in FIG. 6.

Then, the rotational speed of the carrier Ca of the first planetary gear mechanism 5 becomes $\{j+1+ik/(k+1)\}p/\{(i+1)(j+1)p-ijq\}$, the rotational speed of the ring gear Rb of the second planetary gear mechanism 6 becomes $\{j+1+ik/(k+1)\}q/\{(i+1)(j+1)p-ijq\}$, and the output shaft 3 rotates at the speed of $\{j+1+ik/(k+1)\}/\{(i+1)(j+1)p-ijq\}$, so that the third gear speed is established.

In order to establish a fourth gear speed, the TCU engages the first clutch C1 and the third clutch C3. By doing so, the rotational speed of the sun gear Sa of the first planetary gear mechanism 5 and the rotational speed of the sun gear Sb of the second planetary gear mechanism 6 both become "1". Further, the ring gear Ra of the first planetary gear mechanism 5 and the carrier Cb of the second planetary gear mechanism 6 rotate at a uniform velocity, the ring gear Rb of the second planetary gear mechanism 6 rotates at a speed of q/p the rotational speed of the carrier Ca of the first planetary gear mechanism 5, so that the velocity lines of the first planetary gear mechanism 5 and the second planetary gear mechanism 6 become lines indicated by "4th" in FIG. 6.

Then, the rotational speed of the carrier Ca of the first planetary gear mechanism 5 becomes $(i+j+1)p/\{(i+1)(j+1)p-ijq\}$, the rotational speed of the ring gear Rb of the second planetary gear mechanism 6 becomes $(i+j+1)q/\{(i+1)(j+1)p-ijq\}$, and the output shaft 3 rotates at the speed of $(i+j+1)/\{(i+1)(j+1)p-ijq\}$, so that the fourth gear speed is established.

In order to establish a fifth gear speed, the TCU engages the second clutch C2 and the third clutch C3. By doing so, the rotational speed of the sun gear Sa of the first planetary gear mechanism 5 and the rotational speed of the ring gear Ra of the first planetary gear mechanism 5 both become "1", and the first planetary gear mechanism 5 is in a locked state, so that the velocity line of the first planetary gear mechanism 5 becomes a line indicated by "5th" in FIG. 6. Further, the rotational speed of the carrier Ca of the first planetary gear mechanism 5 becomes "1", and the output shaft 3 rotates at a speed of 1/p, so that the fifth gear speed is established.

In order to establish a sixth gear speed, the TCU engages the first clutch C1 and the second clutch C2. By doing so, the rotational speed of the sun gear Sb of the second planetary gear mechanism 6 and the rotational speed of the carrier Cb of the second planetary gear mechanism 6 both become "1", and the second planetary gear mechanism 6 is in a locked state, so that the velocity line of the second planetary gear mechanism 6 becomes a line indicated by "6th" in FIG. 6. Further, the rotational speed of the ring gear Rb of the second planetary gear mechanism 6 becomes "1", and the output shaft 3 rotates at a speed of 1/q, so that the sixth gear speed is established.

In order to establish a seventh gear speed, the TCU engages the second clutch C2 and the third brake B3. By doing so, the rotational speed of the sun gear Sb of the second planetary gear mechanism 6 becomes k/(k+1), the rotational speed of the carrier Cb of the second planetary gear mechanism 6 becomes "1", so that the velocity lines of the second planetary gear mechanism 6 and the third planetary gear mechanism 7 become lines indicated by "7th" in FIG. 6. Then, the rotational speed of the ring gear Rb of the second planetary gear mechanism 6 becomes $\{(j+1)-k/(k+1)\}/j$, the output shaft 3 rotates at the speed of $\{(j+1)-k(k+1)\}/(jq)$, so that the seventh gear speed is established.

In order to establish an eighth gear speed, the TCU engages the second clutch C2 and the first brake B1. By doing so, the rotational speed of the sun gear Sb of the second planetary gear mechanism 6 becomes "0", the rotational speed of the carrier Cb of the second planetary gear mechanism 6 becomes "1", so that the velocity line of the second planetary gear mechanism 6 becomes a line indicated by "8th" in FIG. 6. Then, the rotational speed of the ring gear Rb of the second planetary gear mechanism 6 becomes (j+1)/j, the output shaft 3 rotates at the speed of (j+1)/(jq), so that the eighth gear speed is established.

In order to establish a reverse first gear speed, the TCU engages the second brake B2 and the third brake B3. By doing so, the rotational speed of the sun gear Sb of the second planetary gear mechanism 6 becomes k/(k+1), the rotational speed of the carrier Cb of the second planetary gear mechanism 6 becomes "0", so that the velocity lines of the second planetary gear mechanism 6 and the third planetary gear mechanism 7 become lines indicated by "Rvs1" in FIG. 6. Then, the rotational speed of the ring gear Rb of the second planetary gear mechanism 6 becomes $-k/\{(k+1)j\}$, the output shaft 3 rotates at the speed of $-k/\{(k+1)jq\}$, so that the reverse first gear speed is established.

In order to establish a reverse second gear speed, the TCU engages the first clutch C1 and the second brake B2. By doing so, the rotational speed of the sun gear Sb of the second planetary gear mechanism 6 becomes "1", and the rotational speed of the carrier Cb of the second planetary gear mechanism 6 becomes "0", so that the velocity line of the second planetary gear mechanism 6 becomes a line indicated by "Rvs2" in FIG. 6. Then, the rotational speed of the ring gear Rb of the second planetary gear mechanism 6 becomes −1/j, the output shaft 3 rotates at the speed of −1/(jq), so that the second reverse gear speed is established.

FIG. 5(b) is a table collectively indicating the relationship between each of the gear speed and the engagement condition of the clutches C1, C2 and C3, and the brakes B1, B2 and B3 explained above, and "o" represents engagement. Further, FIG. 5(b) shows a gear ratio of each gear speed, when the gear ratio i of the first planetary gear mechanism 5 is set to 2.40, the gear ratio j of the second planetary gear mechanism 6 is set to 2.10, the gear ratio k of the third planetary gear mechanism 7 is set to 2.20, the gear ratio p of the first gear row G1 is set to 1.18, and the gear ratio q of the second gear row G2 is set to 0.95.

According to the fourth embodiment, the third planetary gear mechanism 7 is arranged at an inner side in the diameter direction of the first planetary gear mechanism 5. Therefore, even though the automatic transmission has a gear change function of 8 speeds in the forward direction, the shaft length of the transmission is not increased.

Next, explanation will be given on a fifth embodiment shown in FIG. 7(a). The fifth embodiment is the case where, similarly to the fourth embodiment, the third planetary gear mechanism 7 of the single pinion type is added to the first embodiment mentioned above. In the fifth embodiment, the sun gear Sc of the third planetary gear mechanism 7 and the ring gear Rb of the second planetary gear mechanism 6 are united together, and the third planetary gear mechanism 7 is arranged at an outer side in the diameter direction of the second planetary gear mechanism 6.

The carrier Cc of the third planetary gear mechanism 7 is coupled to the sun gear Sb of the second planetary gear mechanism 6 as the fourth element. Further, as the engagement mechanism, the third brake B3 as a sixth engagement mechanism which is capable of switching between the state of fixing the ring gear Rc of the third planetary gear mechanism 7 to the transmission case 1 and the state of releasing the fixture is added in this embodiment. The configurations other than those mentioned above are the same as in the first embodiment.

Figure 8:
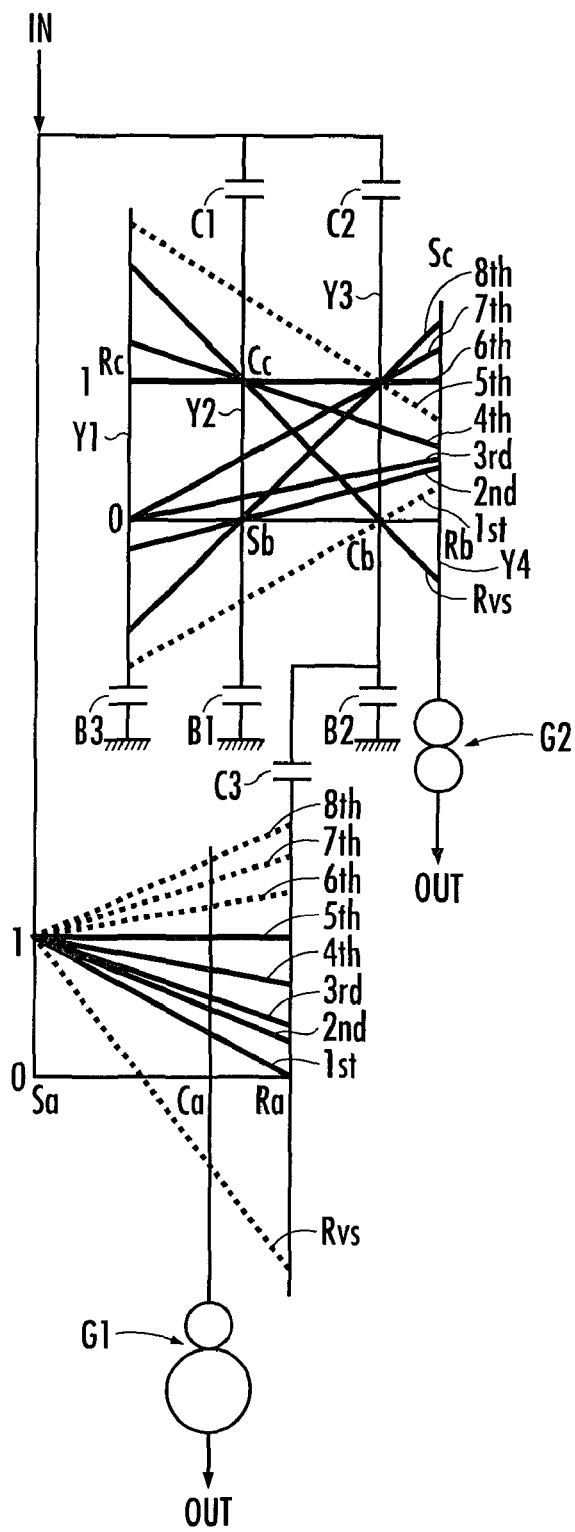
FIG. 8 is a velocity diagram of the first planetary gear mechanism and the compound planetary gear mechanism of the fifth embodiment.

In the fifth embodiment, a compound planetary gear mechanism is configured from the second planetary gear mechanism 6 and the third planetary gear mechanism 7. At the top of FIG. 8, there is illustrated a velocity diagram of the compound planetary gear mechanism. In the velocity diagram, the ring gear Rc of the third planetary gear mechanism 7 is positioned on a vertical line Y1. Further, the carrier Cc of the third planetary gear mechanism 7 and the sun gear Sb of the second planetary gear mechanism 6 are positioned on a vertical line Y2.

The carrier Cb of the second planetary gear mechanism 6 is positioned on a vertical line Y3. The sun gear Sc of the third planetary gear mechanism 7 and the ring gear Rb of the second planetary gear mechanism 6 are positioned on the vertical line Y4. Here, when taking the distance between the vertical line Y4 and the vertical line Y3 as 1, the distance between the vertical line Y3 and the vertical line Y2 becomes j (j is the gear ratio of the second planetary gear mechanism 6), and the distance between the vertical line Y2 and the vertical line Y1 becomes (j+1)/k (k is the gear ratio of the third planetary gear mechanism 7).

In the fifth embodiment, in order to establish a first gear speed, the TCU engages the third clutch C3 and the second brake B2. By doing so, the rotational speed of the sun gear Sa of the first planetary gear mechanism 5 becomes "1", and the rotational speed of the ring gear Ra of the first planetary gear mechanism 5 becomes "0", so that the velocity line of the first planetary gear mechanism 5 becomes a line indicated by "1st" in FIG. 8, and the first gear speed is established.

In order to establish a second gear speed, the TCU engages the third clutch C3 and the first brake B1. By doing so, the rotational speed of the sun gear Sa of the first planetary gear mechanism 5 becomes "1", and the rotational speed of the sun gear Sb of the second planetary gear mechanism 6 becomes "0". Further, the ring gear Ra of the first planetary gear mechanism 5 and the carrier Cb of the second planetary gear mechanism 6 rotate at a uniform velocity, the ring gear Rb of the second planetary gear mechanism 6 rotates at a speed of q/p the rotational speed of the carrier Ca of the first planetary gear mechanism 5, so that the velocity lines of the first planetary gear mechanism 5 and the compound planetary gear mechanism become lines indicated by "2nd" in FIG. 8, and the second gear speed is established.

In order to establish a third gear speed, the TCU engages the third clutch C3 and the third brake B3. By doing so, the rotational speed of the sun gear Sa of the first planetary gear mechanism 5 becomes "1", and the rotational speed of the ring gear Rc of the third planetary gear mechanism 7 becomes "0". Further, the ring gear Ra of the first planetary gear mechanism 5 and the carrier Cb of the second planetary gear mechanism 6 rotate at a uniform velocity, the ring gear Rb of the second planetary gear mechanism 6 rotates at a speed of q/p the rotational speed of the carrier Ca of the first planetary gear mechanism 5, so that the velocity lines of the first planetary gear mechanism 5 and the compound planetary gear mechanism become lines indicated by "3rd" in FIG. 8, and the third gear speed is established.

In order to establish a fourth gear speed, the TCU engages the first clutch C1 and the third clutch C3. By doing so, the rotational speed of the sun gear Sa of the first planetary gear mechanism 5 and the rotational speed of the sun gear Sb of the second planetary gear mechanism 6 both become "1". Further, the ring gear Ra of the first planetary gear mechanism 5 and the carrier Cb of the second planetary gear mechanism 6 rotate at a uniform velocity, the ring gear Rb of the second planetary gear mechanism 6 rotates at a speed of q/p the rotational speed of the carrier Ca of the first planetary gear mechanism 5, so that the velocity lines of the first planetary gear mechanism 5 and the compound planetary gear mechanism become lines indicated by "4th" in FIG. 8, and the fourth gear speed is established.

In order to establish a fifth gear speed, the TCU engages the second clutch C2 and the third clutch C3. By doing so, the rotational speed of the sun gear Sa of the first planetary gear mechanism 5 and the rotational speed of the ring gear Ra of the first planetary gear mechanism 5 both become "1", and the first planetary gear mechanism 5 is in a locked state. Then, the velocity line of the first planetary gear mechanism 5 becomes a line indicated by "5th" in FIG. 8, and the fifth gear speed is established.

In order to establish a sixth gear speed, the TCU engages the first clutch C1 and the second clutch C2. By doing so, the rotational speed of the sun gear Sb of the second planetary gear mechanism 6 and the rotational speed of the carrier Cb of the second planetary gear mechanism 6 both become "1", and the second planetary gear mechanism 6 is in a locked state. Then, the velocity line of the compound planetary gear mechanism becomes a line indicated by "6th" in FIG. 8, and the sixth gear speed is established.

In order to establish a seventh gear speed, the TCU engages the second clutch C2 and the third brake B3. By doing so, the rotational speed of the ring gear Rc of the third planetary gear mechanism 7 becomes "0", and the rotational speed of the carrier Cb of the second planetary gear mechanism 6 becomes "1". Then, the velocity line of the compound planetary gear mechanism becomes a line indicated by "7th" in FIG. 8, and the seventh gear speed is established.

In order to establish an eight gear speed, the TCU engages the second clutch C2 and the first brake B1. By doing so, the rotational speed of the sun gear Sb of the second planetary gear mechanism 6 becomes "0", and the rotational speed of the carrier Cb of the second planetary gear mechanism 6 becomes "1". Then, the velocity line of the second planetary gear mechanism 6 becomes a line indicated by "8th" in FIG. 8, and the eighth gear speed is established.

In order to establish a reverse gear, the TCU engages the first clutch C1 and the second brake B2. By doing so, the rotational speed of the sun gear Sb of the second planetary gear mechanism 6 becomes "1", and the rotational speed of the carrier Cb of the second planetary gear mechanism 6 becomes "0". Then, the velocity line of the compound planetary gear mechanism becomes a line indicated by "Rvs" in FIG. 8, and the reverse gear speed is established.

Figure 7:
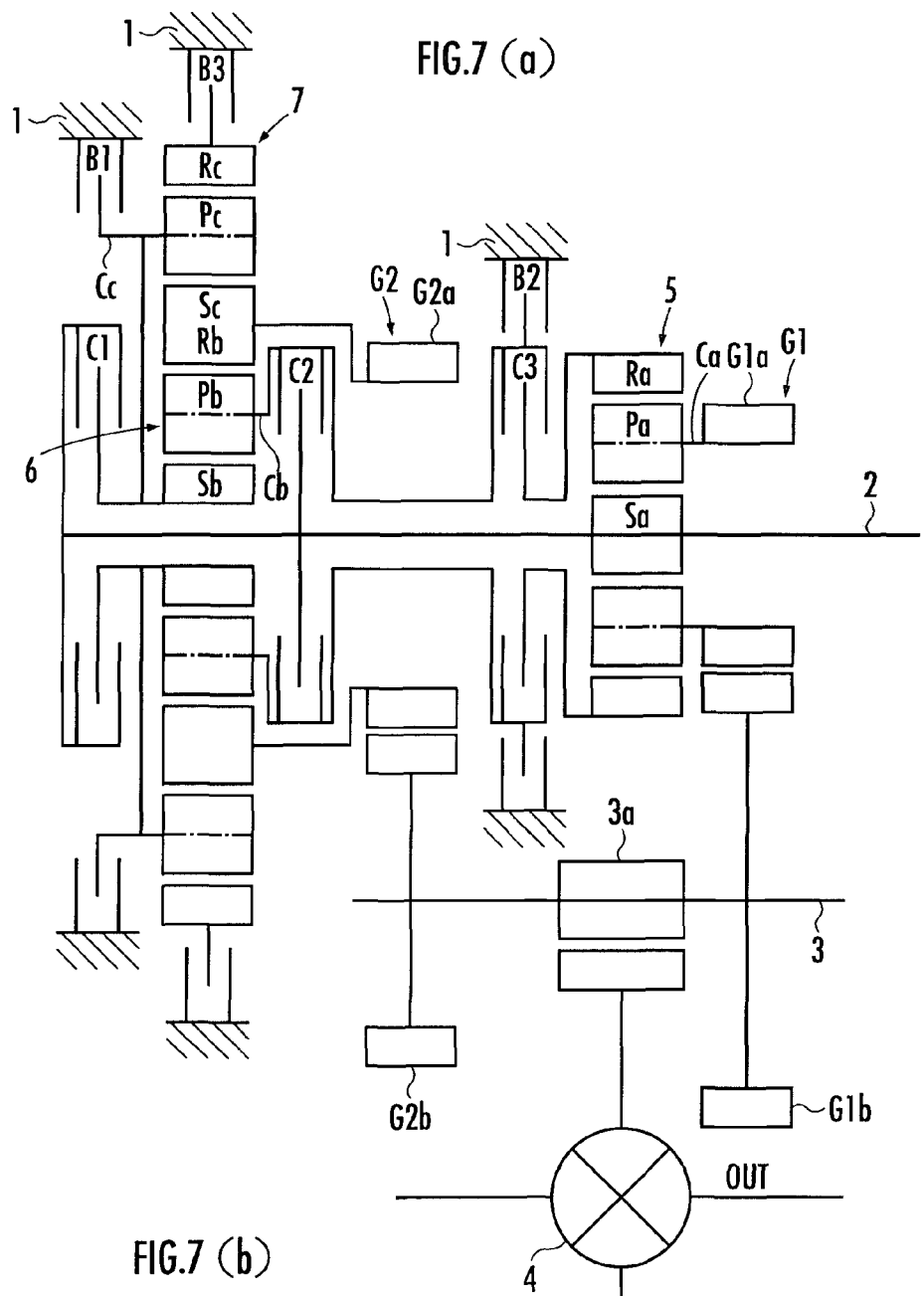
FIG. 7(a) is a skeletal view of the automatic transmission according to a fifth embodiment of the present invention.
FIG. 7(b) is a table collectively indicating the engagement condition of each engagement mechanism in each gear speed in the fifth embodiment.

FIG. 7(b) is a table collectively indicating the relationship between each of the gear speed and the engagement condition of the clutches C1, C2 and C3, and the brakes B1, B2 and B3 explained above, and "o" represents engagement. Even in the fifth embodiment, it is possible to carry out gear changes in eight speeds in the forward direction. Further, because the third planetary gear mechanism 7 is arranged at an outer side in the diameter direction of the second planetary gear mechanism 6, the shaft length of the transmission is not increased.

Next, explanation will be given on a sixth embodiment shown in FIG. 9(a). The sixth embodiment is the case where, a third planetary gear mechanism 7 of the single pinion type is added to the first embodiment mentioned above. In the sixth embodiment, the ring gear Rc of the third planetary gear mechanism 7 and the sun gear Sb of the second planetary gear mechanism 6 as the fourth element are united together, and the third planetary gear mechanism 7 is arranged at an inner side in the diameter direction of the second planetary gear mechanism 6.

The sun gear Sc of the third planetary gear mechanism 7 is coupled to the input shaft 2. Further, in each of the abovedescribed embodiments, the sun gear Sb of the second planetary gear mechanism 6 is coupled to the input shaft 2 via the first clutch C1. However, in the sixth embodiment, the carrier Cc of the third planetary gear mechanism 7 is coupled to the input shaft 2 via the first clutch C1. Further, as the engagement mechanism, the third brake B3 as the sixth engagement mechanism which is capable of switching between the state of fixing the carrier Cc of the third planetary gear mechanism 7 to the transmission case 1 and the state of releasing the fixture is added in this embodiment. The configurations other than those mentioned above are the same as in the first embodiment.

Figure 10:
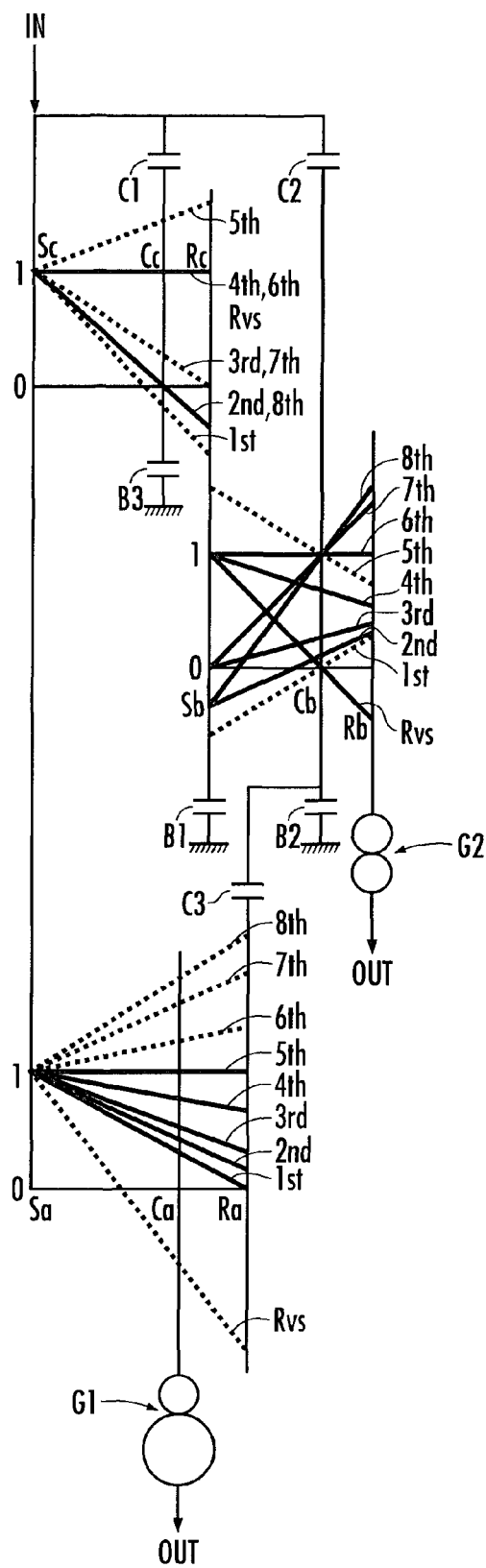
FIG. 10 is a velocity diagram of the first through third planetary gear mechanisms of the sixth embodiment.

At the top of FIG. 10, there is illustrated a velocity diagram of the third planetary gear mechanism 7. With reference to the velocity diagram, when the first clutch C1 is engaged, the rotational speed of the sun gear Sc and the rotational speed of the carrier Cc of the third planetary gear mechanism 7 both become "1", the third planetary gear mechanism 7 is in a locked state, and the rotational speed of the sun gear Sb of the second planetary gear mechanism 6 which is united with the ring gear Rc of the third planetary gear mechanism 7 becomes "1".

Therefore, even in the sixth embodiment, the first clutch C1 functions as the first engagement mechanism which is capable of switching between the state of coupling the sun gear Sb of the second planetary gear mechanism 6 as the fourth element with the input shaft 2 and the state of releasing the coupled condition. Here, similar to the first embodiment, the sun gear Sb of the second planetary gear mechanism 6 may be coupled to the input shaft 2 via the first clutch C1.

Further, when the third brake B3 is engaged, the rotational speed of the carrier Cc of the third planetary gear mechanism 7 becomes "0", and the rotational speed of the sun gear Sb of the second planetary gear mechanism 6 becomes −1/k (k is the gear ratio of the third planetary gear mechanism 7).

In the sixth embodiment, in order to establish a first gear speed, the TCU engages the third clutch C3 and the second brake B2. By doing so, the rotational speed of the sun gear Sa of the first planetary gear mechanism 5 becomes "1", and the rotational speed of the ring gear Ra of the first planetary gear mechanism 5 becomes "0", so that the velocity line of the first planetary gear mechanism 5 becomes a line indicated by "1st" in FIG. 10, and the first gear speed is established.

In order to establish a second gear speed, the TCU engages the third clutch C3 and the third brake B3. By doing so, the rotational speed of the sun gear Sa of the first planetary gear mechanism 5 becomes "1", and the rotational speed of the sun gear Sb of the second planetary gear mechanism 6 becomes −1/k. Further, the ring gear Ra of the first planetary gear mechanism 5 and the carrier Cb of the second planetary gear mechanism 6 rotate at a uniform velocity, the ring gear Rb of the second planetary gear mechanism 6 rotates at a speed of q/p the rotational speed of the carrier Ca of the first planetary gear mechanism 5, so that the velocity lines of the first planetary gear mechanism 5, the second planetary gear mechanism 6 and the third planetary gear mechanism 7 become lines indicated by "2nd" in FIG. 10, and the second gear speed is established.

In order to establish a third gear speed, the TCU engages the third clutch C3 and the first brake B1. By doing so, the rotational speed of the sun gear Sa of the first planetary gear mechanism 5 becomes "1", and the rotational speed of the sun gear Sb of the second planetary gear mechanism 6 becomes "0". Further, the ring gear Ra of the first planetary gear mechanism 5 and the carrier Cb of the second planetary gear mechanism 6 rotate at a uniform velocity, the ring gear Rb of the second planetary gear mechanism 6 rotates at a speed of q/p the rotational speed of the carrier Ca of the first planetary gear mechanism 5, so that the velocity lines of the first planetary gear mechanism 5 and the second planetary gear mechanism 6 become lines indicated by "3rd" in FIG. 10, and the third gear speed is established.

In order to establish a fourth gear speed, the TCU engages the first clutch C1 and the third clutch C3. By doing so, the rotational speed of the sun gear Sa of the first planetary gear mechanism 5 and the rotational speed of the sun gear Sb of the second planetary gear mechanism 6 both become "1". Further, the ring gear Ra of the first planetary gear mechanism 5 and the carrier Cb of the second planetary gear mechanism 6 rotate at a uniform velocity, the ring gear Rb of the second planetary gear mechanism 6 rotates at a speed of q/p the rotational speed of the carrier Ca of the first planetary gear mechanism 5, so that the velocity lines of the first planetary gear mechanism 5, the second planetary gear mechanism 6 and the third planetary gear mechanism 7 become lines indicated by "4th" in FIG. 10, and the fourth gear speed is established.

In order to establish a fifth gear speed, the TCU engages the second clutch C2 and the third clutch C3. By doing so, the rotational speed of the sun gear Sa of the first planetary gear mechanism 5 and the rotational speed of the ring gear Ra of the first planetary gear mechanism 5 both become "1", and at this time the first planetary gear mechanism 5 is in a locked state. Then, the velocity line of the first planetary gear mechanism 5 becomes a line indicated by "5th" in FIG. 10, and the fifth gear speed is established.

In order to establish a sixth gear speed, the TCU engages the first clutch C1 and the second clutch C2. By doing so, the rotational speed of the sun gear Sb of the second planetary gear mechanism 6 and the rotational speed of the carrier Cb of the second planetary gear mechanism 6 both become "1", and the second planetary gear mechanism 6 is in a locked state. Then, the velocity lines of the second planetary gear mechanism 6 and the third planetary gear mechanism 7 become lines indicated by "6th" in FIG. 10, and the sixth gear speed is established.

In order to establish a seventh gear speed, the TCU engages the second clutch C2 and the first brake B1. By doing so, the rotational speed of the sun gear Sb of the second planetary gear mechanism 6 becomes "0", and the rotational speed of the carrier Cb of the second planetary gear mechanism 6 becomes "1". Then, the velocity line of the second planetary gear mechanism 6 becomes a line indicated by "7th" in FIG. 10, and the seventh gear speed is established.

In order to establish an eight gear speed, the TCU engages the second clutch C2 and the third brake B3. By doing so, the rotational speed of the sun gear Sb of the second planetary gear mechanism 6 becomes −1/k, and the rotational speed of the carrier Cb of the second planetary gear mechanism 6 becomes "1". Then, the velocity lines of the second planetary gear mechanism 6 and the third planetary gear mechanism 7 become lines indicated by "8th" in FIG. 10, and the eighth gear speed is established.

In order to establish a reverse gear, the TCU engages the first clutch C1 and the second brake B2. By doing so, the rotational speed of the sun gear Sb of the second planetary gear mechanism 6 becomes "1", and the rotational speed of the carrier Cb of the second planetary gear mechanism 6 becomes "0". Then, the velocity lines of the second planetary gear mechanism 6 and the third planetary gear mechanism 7 become lines indicated by "Rvs" in FIG. 10, and the reverse gear speed is established.

Figure 9:
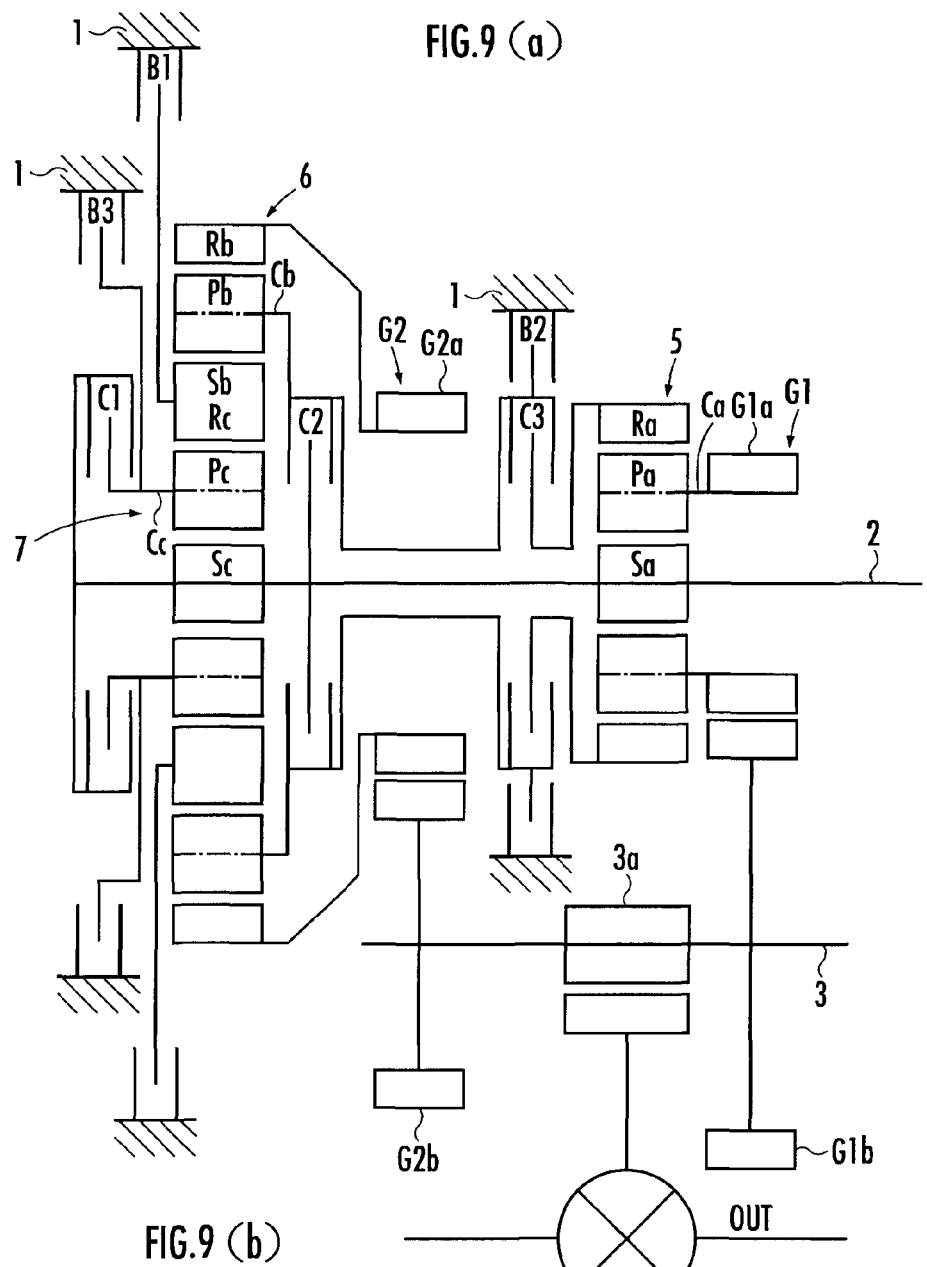
FIG. 9(a) is a skeletal view of the automatic transmission according to a sixth embodiment of the present invention.
FIG. 9(b) is a table collectively indicating the engagement condition of each engagement mechanism in each gear speed in the sixth embodiment.

FIG. 9(b) is a table collectively indicating the relationship between each of the gear speed and the engagement condition of the clutches C1, C2 and C3, and the brakes B1, B2 and B3 explained above, and "o" represents engagement. Even in the sixth embodiment, it is possible to carry out gear changes in eight speeds in the forward direction. Further, because the third planetary gear mechanism 7 is arranged at an inner side in the diameter direction of the second planetary gear mechanism 6, the shaft length of the transmission is not increased.

Figure 11:
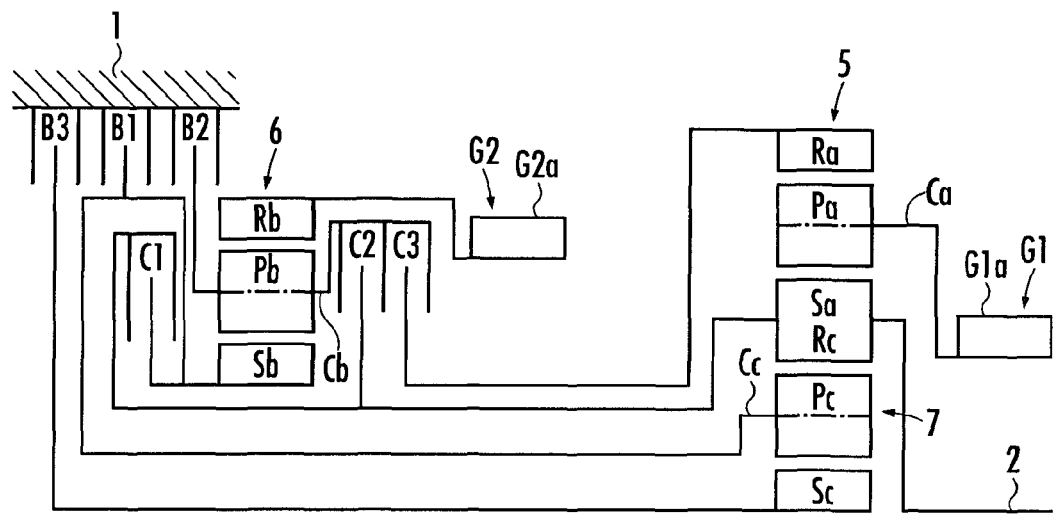
FIG. 11 is a skeletal view of a seventh embodiment of the present invention.

Here, in the automatic transmission of the fourth through sixth embodiments, it is possible to alter the arrangement position of each engagement mechanism. For example, in the fourth embodiment, the third clutch C3 and the second brake B2 are arranged between the first planetary gear mechanism 5 and the third planetary gear mechanism 7, and the second gear row G2. However, it is also possible to arrange the third clutch C3 between the second gear row G2 and the second planetary gear mechanism 6, and adjacent to the second clutch C2, and to arrange the second brake B2 at one side in the axial direction of the second planetary gear mechanism 6 and adjacent to the first brake B1, as is in a seventh embodiment shown in FIG. 11.

Figure 12:
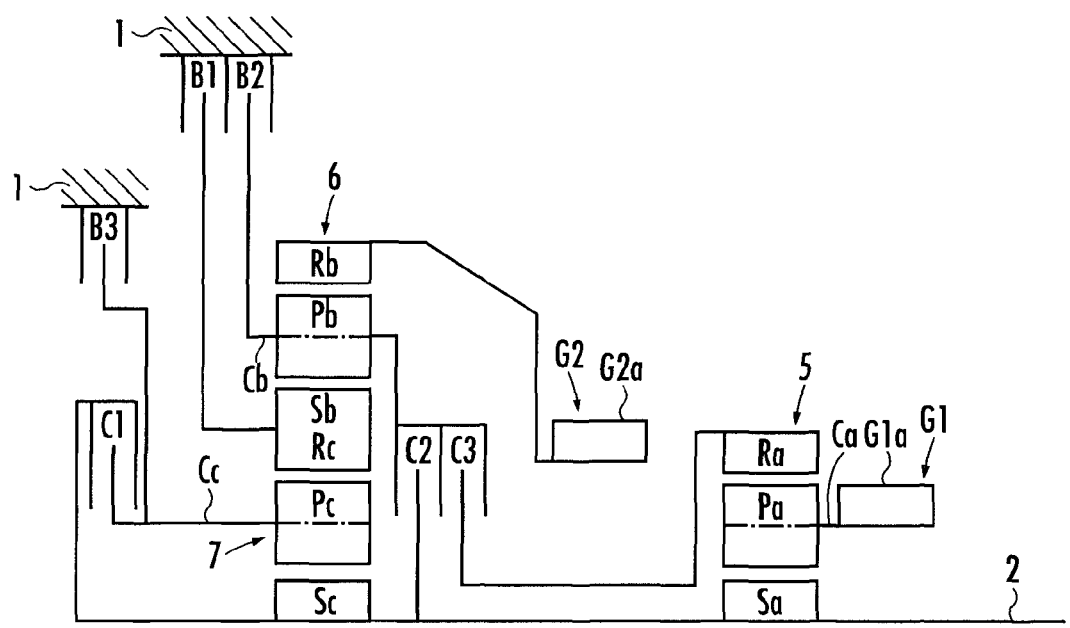
FIG. 12 is a skeletal view of an eighth embodiment of the present invention.

Further, in the sixth embodiment, the third clutch C3 and the second brake B2 are arranged between the first planetary gear mechanism 5 and the second gear row G2. However, it is also possible to arrange the third clutch C3 between the second gear row G2 and the second planetary gear mechanism 6 and the third planetary gear mechanism 7, and adjacent to the second clutch C2, and to arrange the second brake B2 at one side in the axial direction of the second planetary gear mechanism 6 and the third planetary gear mechanism 7 and adjacent to the first brake B1, as in an eighth embodiment shown in FIG. 12.

Figure 13:
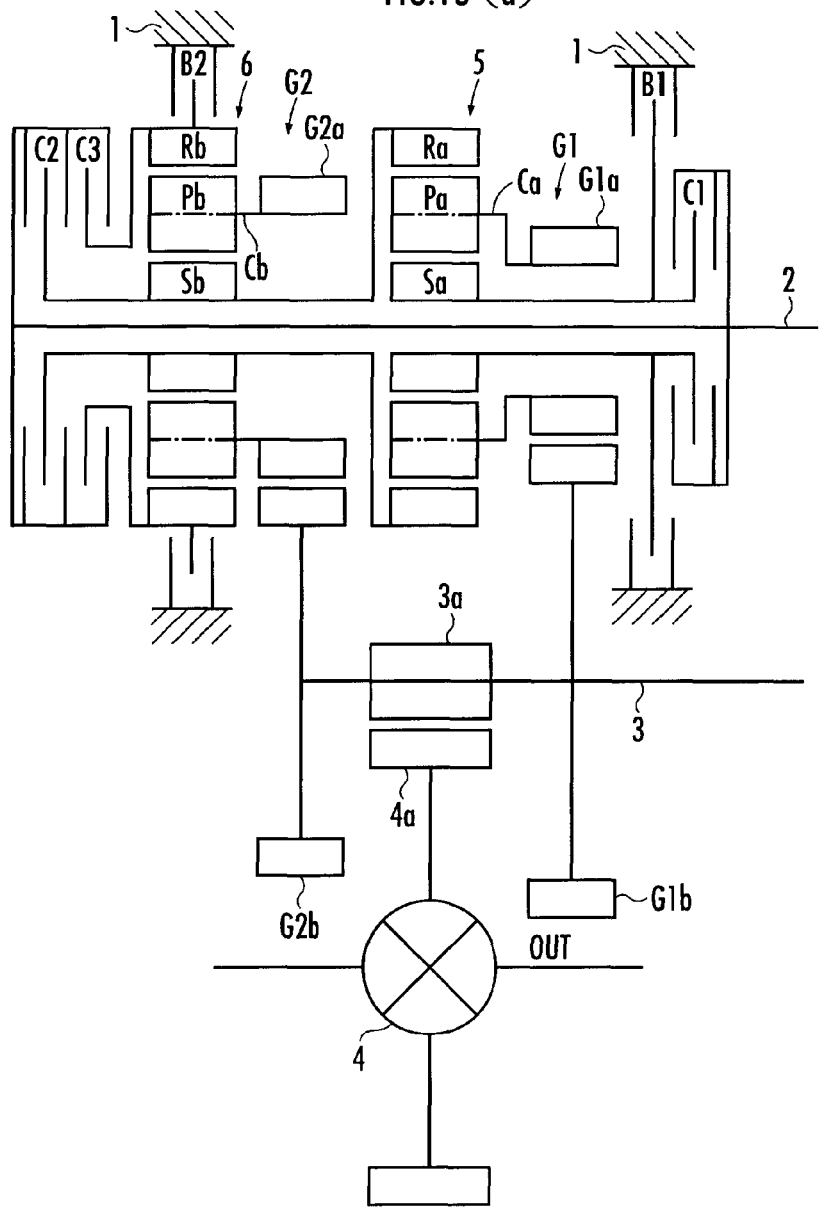
FIG. 13(a) is a skeletal view of the automatic transmission according to a ninth embodiment of the present invention.
FIG. 13(b) is a table collectively indicating the engagement condition of each engagement mechanism in each gear speed in the ninth embodiment.

FIG. 13(a) shows a ninth embodiment of the automatic transmission of the present invention. In the ninth embodiment, similarly to the first embodiment, the automatic transmission is equipped with the input shaft 2 axially supported inside the transmission case 1 so that it is rotatable therein and coupled to the driving source such as an engine (not shown), and the output shaft 3 as the output member arranged in parallel to the input shaft 2. The rotation of the output shaft 3 is transmitted to the left and right driving wheels of the vehicle via the differential gear 4 fixed with the final driven gear 4a which is brought into meshed engagement with the output gear 3a fixed to the output shaft 3.

Further, inside the transmission case 1, the first planetary gear mechanism 5 and the second planetary gear mechanism 6 are arranged coaxially with the input shaft 2. The first planetary gear mechanism 5 is configured from the sun gear Sa, the ring gear Ra, the pinion Pa, and the carrier Ca. The pinion Pa is brought into meshed engagement with the sun gear Sa and the ring gear Ra, and is supported by the carrier Ca rotatably and revolvably. That is, the first planetary gear mechanism 5 is configured from the planetary gear mechanism of the single pinion type.

Figure 14:
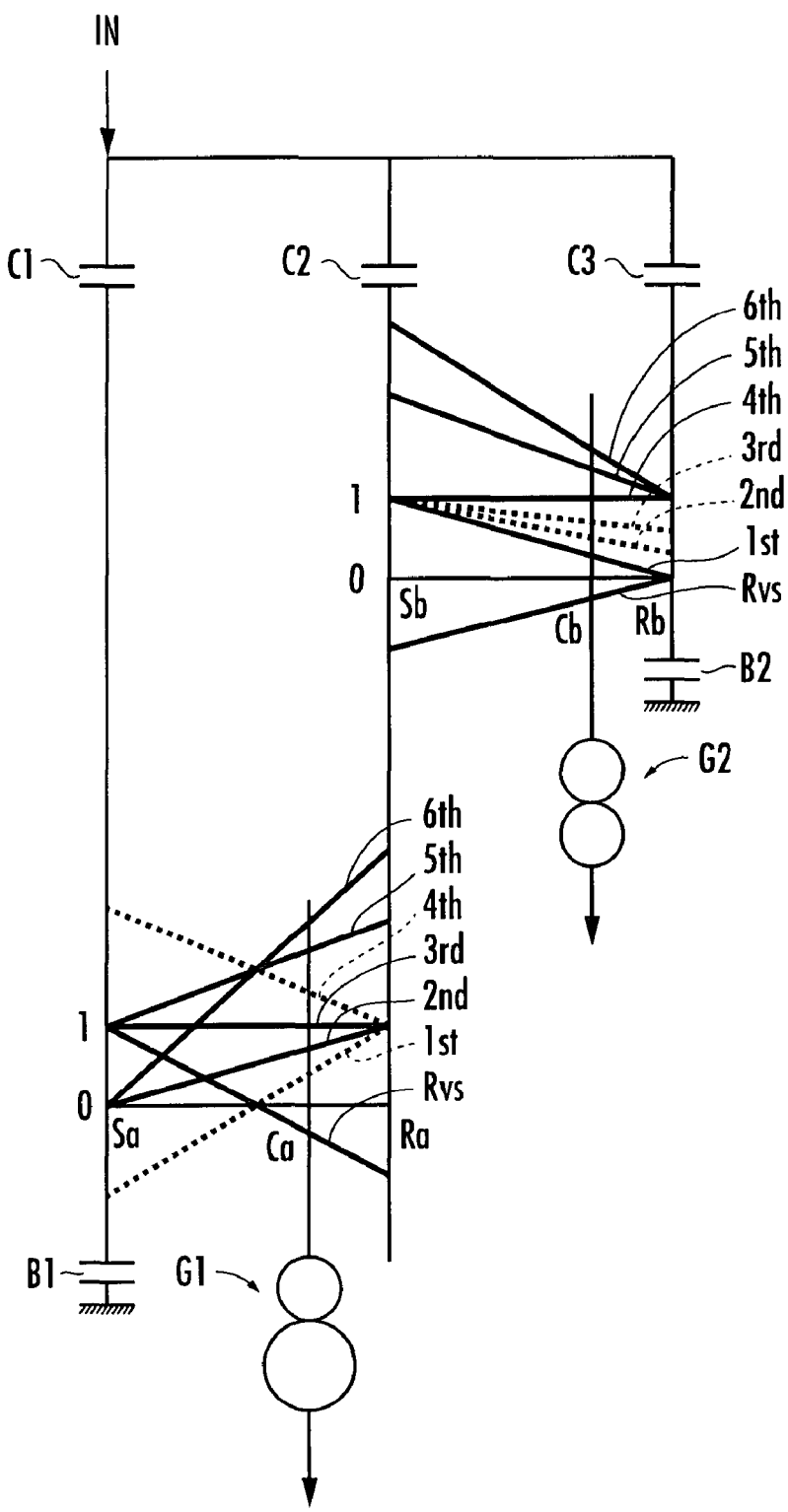
FIG. 14 is a velocity diagram of the first planetary gear mechanism and the second planetary gear mechanism of the ninth embodiment.

At the bottom of FIG. 14, there is illustrated a velocity diagram of the first planetary gear mechanism 5. With reference to the velocity diagram, when three elements comprised of the sun gear Sa, the carrier Ca and the ring gear Ra of the first planetary gear mechanism 5 are taken from the left in the order of the distance corresponding to a gear ratio in the velocity diagram as the first element, the second element, and the third element, respectively, the first element becomes the sun gear Sa, the second element becomes the carrier Ca, and the third element becomes the ring gear Ra. Here, the ratio of the distance between the sun gear Sa and the carrier Ca and the distance between the carrier Ca and the ring gear Ra is, when taking the gear ratio (number of teeth of the ring gear/number of teeth of the sun gear) of the first planetary gear mechanism 5 as "i", set to i:1. Here, in the velocity diagram, the lower horizontal line and the upper horizontal line respectively indicates the rotational speed of "0" and "1" (rotational speed equal to that of the input shaft 2).

The second planetary gear mechanism 6 is configured from, similarly to the first planetary gear mechanism 5, the sun gear Sb, the ring gear Rb, the pinion Pb, and the carrier Cb. The pinion Pb is brought into meshed engagement with the sun gear Sb and the ring gear Rb, and is supported by the carrier Cb rotatably and revolvably. That is, the second planetary gear mechanism 6 is also configured from the planetary gear mechanism of the single pinion type.

At the top of FIG. 14, there is illustrated a velocity diagram of the second planetary gear mechanism 6. With reference to the velocity diagram, when three elements comprised of the sun gear Sb, the carrier Cb and the ring gear Rb of the second planetary gear mechanism 6 are taken from the left in the order of the distance corresponding to a gear ratio in the velocity diagram as the fourth element, the fifth element, and the sixth element, respectively, the fourth element becomes the sun gear Sb, the fifth element becomes the carrier Cb, and the sixth element becomes the ring gear Rb. Here, the ratio of the distance between the sun gear Sb and the carrier Cb and the distance between the carrier Cb and the ring gear Rb is, when taking the gear ratio of the second planetary gear mechanism 6 as "j", set to j:1.

The ring gear Ra (the third element) of the first planetary gear mechanism 5 and the sun gear Sb (the fourth element) of the second planetary gear mechanism 6 are coupled together so as to configure coupled body Ra and Sb. Further, the carrier Ca (the second element) of the first planetary gear mechanism 5 is coupled to the output shaft 3 via the first gear row G1 comprised of the driving gear G1a fixed to the carrier Ca and the driven gear G1b fixed to the output shaft 3 and brought into meshed engagement with the driving gear G1a. The carrier Cb (the fifth element) of the second planetary gear mechanism 6 is coupled to the output shaft 3 via the second gear row G2 comprised of the driving gear G2a fixed to the carrier Cb and the driven gear G2b fixed to the output shaft 3 and brought into meshed engagement with the driving gear G2a.

Here, when the gear ratio (number of teeth of the driven gear/number of teeth of the driving gear) of the first gear row G1 is taken as p, the gear ratio of the second gear row G2 is taken as q, it is set to become p>q. Further, the carrier Ca of the first planetary gear mechanism 5 and the carrier Cb of the second planetary gear mechanism 6 are coupled to the output shaft 3 via both gear rows G1 and G2. As such, the carrier Cb of the second planetary gear mechanism 6 rotates at the speed of q/p of the rotational speed of the carrier Ca of the first planetary gear mechanism 5.

In the ninth embodiment, as the engagement mechanism, the automatic transmission is equipped the first clutch C1 as the first engagement mechanism, the second clutch C2 as the second engagement mechanism, the third clutch C3 as the third engagement mechanism, the first brake B1 as the fourth engagement mechanism, and the second brake B2 as the fifth engagement mechanism.

The first clutch C1 couples the sun gear Sa (the first element) of the first planetary gear mechanism 5 with the input shaft 2 releasably. The second clutch C2 couples the coupled bodies Ra and Sb (the third element, the fourth element) with the input shaft 2 releasably. The third clutch C3 couples the ring gear Rb (the sixth element) of the second planetary gear mechanism 6 with the input shaft 2 releasably.

The first brake B1 fixes the sun gear Sa (the first element) of the first planetary gear mechanism 5 to the transmission case 1 releasably. The second brake B2 fixes the ring gear Rb (the sixth element) of the second planetary gear mechanism 6 to the transmission case 1 releasably. Each engagement mechanism is controlled by a transmission control unit (TCU) not shown.

In the ninth embodiment, in order to establish a first gear speed, the TCU engages the second clutch C2 and the second brake B2. By doing so, the rotational speed of the sun gear Sb of the second planetary gear mechanism 6 becomes "1", and the rotational speed of the ring gear Rb of the second planetary gear mechanism 6 becomes "0", so that the velocity line of the second planetary gear mechanism 6 becomes a line indicated by "1st" in FIG. 14. Then, the rotational speed of the carrier Cb of the second planetary gear mechanism 6 becomes $1/(j+1)$, the output shaft 3 rotates at the speed of $1/\{(j+1)q\}$ via the second gear row G2, so that the first gear speed is established.

In order to establish a second gear speed, the TCU engages the second clutch C2 and the first brake B1. By doing so, the rotational speed of the sun gear Sb of the second planetary gear mechanism 6 and the rotational speed of the ring gear Ra of the first planetary gear mechanism 5 both become "1", and the rotational speed of the sun gear Sa of the first planetary gear mechanism 5 becomes "0", so that the velocity line of the first planetary gear mechanism 5 becomes a line indicated by "2nd" in FIG. 14. Then, the rotational speed of the carrier Ca of the first planetary gear mechanism 5 becomes $i/(i+1)$, the output shaft 3 rotates at the speed of $i/\{(i+1)p\}$, so that the second gear speed is established.

In order to establish a third gear speed, the TCU engages the first clutch C1 and the second clutch C2. By doing so, the rotational speed of the sun gear Sa of the first planetary gear mechanism 5 and the rotational speed of the ring gear Ra of the first planetary gear mechanism 5 both become "1", and the first planetary gear mechanism 5 is in a locked state, so that the velocity line of the first planetary gear mechanism 5 becomes a line indicated by "3rd" in FIG. 14. Further, the rotational speed of the carrier Ca of the first planetary gear mechanism 5 becomes "1", and the output shaft 3 rotates at a speed of $1/p$, so that the third gear speed is established.

In order to establish a fourth gear speed, the TCU engages the second clutch C2 and the third clutch C3. By doing so, the rotational speed of the sun gear Sb of the second planetary gear mechanism 6 and the rotational speed of the ring gear Rb of the second planetary gear mechanism 6 both become "1", and the second planetary gear mechanism 6 is in a locked state, so that the velocity line of the second planetary gear mechanism 6 becomes a line indicated by "4th" in FIG. 14. Then, the rotational speed of the carrier Cb of the second planetary gear mechanism 6 becomes "1", and the output shaft 3 rotates at a speed of $1/q$, so that the fourth gear speed is established.

In order to establish a fifth gear speed, the TCU engages the first clutch C1 and the third clutch C3. By doing so, the rotational speed of the sun gear Sa of the first planetary gear mechanism 5 and the rotational speed of the ring gear Rb of the second planetary gear mechanism 6 both become "1". Further, the ring gear Ra of the first planetary gear mechanism 5 and the sun gear Sb of the second planetary gear mechanism 6 rotate at a uniform velocity, the carrier Cb of the second planetary gear mechanism 6 rotates at a speed of $q/p$ the rotational speed of the carrier Ca of the first planetary gear mechanism 5, so that the velocity lines of the first planetary gear mechanism 5 and the second planetary gear mechanism 6 become lines indicated by "5th" in FIG. 14.

Then, the rotational speed of the carrier Ca of the first planetary gear mechanism 5 becomes $(1-ij)p/\{(i+1)p-(j+1)iq\}$, the rotational speed of the carrier Cb of the second planetary gear mechanism 6 becomes $(1-ij)q/\{(i+1)p-(j+1)iq\}$, and the output shaft 3 rotates at the speed of $(1-ij)/\{(i+1)p-(j+1)iq\}$, so that the fifth gear speed is established.

In order to establish a sixth gear speed, the TCU engages the third clutch C3 and the first brake B1. By doing so, the rotational speed of the sun gear Sa of the first planetary gear mechanism 5 becomes "0", and the rotational speed of the ring gear Rb of the second planetary gear mechanism 6 becomes "1". Further, the ring gear Ra of the first planetary gear mechanism 5 and the sun gear Sb of the second planetary gear mechanism 6 rotate at a uniform velocity, the carrier Cb of the second planetary gear mechanism 6 rotates at a speed of $q/p$ the rotational speed of the carrier Ca of the first planetary gear mechanism 5, so that the velocity lines of the first planetary gear mechanism 5 and the second planetary gear mechanism 6 become lines indicated by "6th" in FIG. 14.

Then, the rotational speed of the carrier Ca of the first planetary gear mechanism 5 becomes $ijp/\{(j+1)iq-(i+1)p\}$, the rotational speed of the carrier Cb of the second planetary gear mechanism 6 becomes $ijq/\{(j+1)iq-(i+1)p\}$, and the output shaft 3 rotates at a speed of $ij/\{(j+1)iq-(i+1)p\}$, so that the sixth gear speed is established.

In order to establish a reverse gear speed, the TCU engages the first clutch C1 and the second brake B2. By doing so, the rotational speed of the sun gear Sa of the first planetary gear mechanism 5 becomes "1", and the rotational speed of the ring gear Rb of the second planetary gear mechanism 6 becomes "0". Further, the ring gear Ra of the first planetary gear mechanism 5 and the sun gear Sb of the second planetary gear mechanism 6 rotate at a uniform velocity, the carrier Cb of the second planetary gear mechanism 6 rotates at a speed of $q/p$ the rotational speed of the carrier Ca of the first planetary gear mechanism 5, so that the velocity lines of the first planetary gear mechanism 5 and the second planetary gear mechanism 6 become lines indicated by "Rvs" in FIG. 14.

Then, the rotational speed of the carrier Ca of the first planetary gear mechanism 5 becomes $p/\{(i+1)p-(j+1)iq\}$, the rotational speed of the carrier Cb of the second planetary gear mechanism 6 becomes $q/\{(i+1)p-(j+1)iq\}$, and the output shaft 3 rotates at the speed of $1/\{(i+1)p-(j+1)iq\}$, so that the reverse gear speed is established.

The velocity lines indicated by dotted line in FIG. 14 represents that, of the first and second planetary gear mechanisms 5 and 6, each element of the other planetary gear mechanism is rotating following the one planetary gear mechanism which is conducting power transmission.

FIG. 13(b) is a table collectively indicating the relationship between each of the gear speed and the engagement condition of the clutches C1, C2 and C3, and the brakes B1 and B2 explained above, and "o" represents engagement. Further, FIG. 13(b) shows a gear ratio (the rotational speed of the input shaft 2/the rotational speed of the output shaft 3) of each gear speed, when the gear ratio i of the first planetary gear mechanism 5 is set to 2.55, the gear ratio j of the second planetary gear mechanism 6 is set to 2.55, the gear ratio p of the first gear row G1 is set to 1.42, and the gear ratio q of the second gear row G2 is set to 1.00. According thereto, a common ratio (ratio of the gear ratios between each gear speed) is set appropriately, and as well as a ratio range (the first gear ratio/the sixth gear ratio) is set appropriately.

Further, according to the ninth embodiment, only two planetary gear mechanisms, i.e., the first and the second planetary gear mechanisms 5 and 6 are used as the planetary gear mechanism. Therefore, it is possible to shorten the shaft length of the transmission, compared to that of the prior art in which three planetary gear mechanisms are used. Further, in the gear speeds other than the fifth gear speed, the sixth gear speed and the reverse gear speed, the power transmission is conducted solely by either one of the first and the second planetary gear mechanisms 5 and 6. Also, in the third gear speed and the fourth gear speed, the first planetary gear mechanism 5 and the second planetary gear mechanism 6 are in a locked state, respectively. Therefore, in these gear speeds, the meshed transmission efficiency becomes 100%, so that the transmission efficiency of the overall automatic transmission is improved.

Here, in the automatic transmission of the ninth embodiment, the planetary gear mechanism of the single pinion type is used in each of the first and the second planetary gear mechanisms 5 and 6. However, it is also possible to configure the first planetary gear mechanism 5 and the second planetary gear mechanism 6 from the planetary gear mechanism of the double pinion type.

When the first planetary gear mechanism 5 is configured from the planetary gear mechanism of the double pinion type, either one of the sun gear and the carrier becomes the first element, the ring gear becomes the second element, and the other one of the sun gear and the carrier becomes the third element. Further, when the second planetary gear mechanism 6 is configured from the planetary gear mechanism of the double pinion type, either one of the sun gear and the carrier becomes the fourth element, the ring gear becomes the fifth element, and the other one of the sun gear and the carrier becomes the sixth element.

Further, in the ninth embodiment, the first clutch C1, the first brake B1, the first gear row G1, the first planetary gear mechanism 5, the second gear row G2, the second planetary gear mechanism 6 and the second brake B2, the third clutch C3, and the second clutch C2 are arranged in this order from one end side around the input shaft 2. However, it is not limited thereto.

Figure 15:
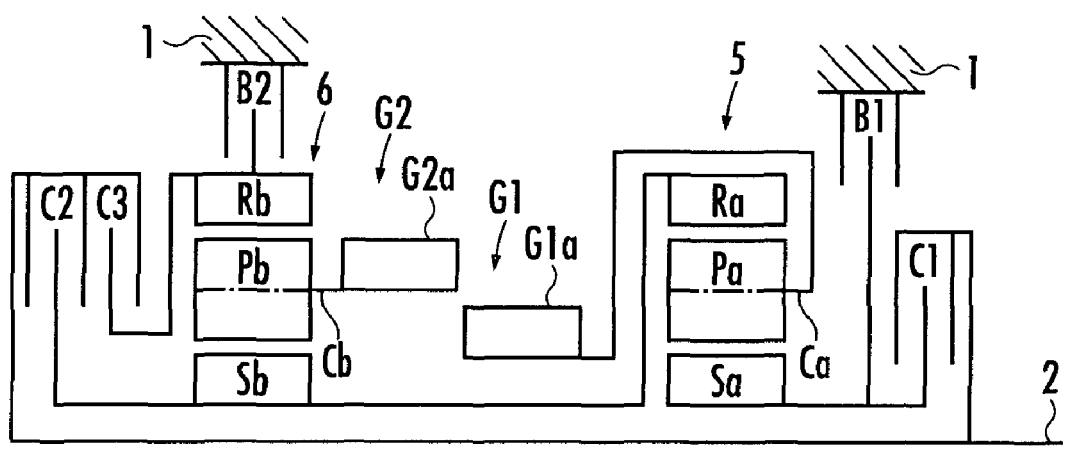
FIG. 15 is a skeletal view of the automatic transmission according to a tenth embodiment of the present invention.
Figure 16:
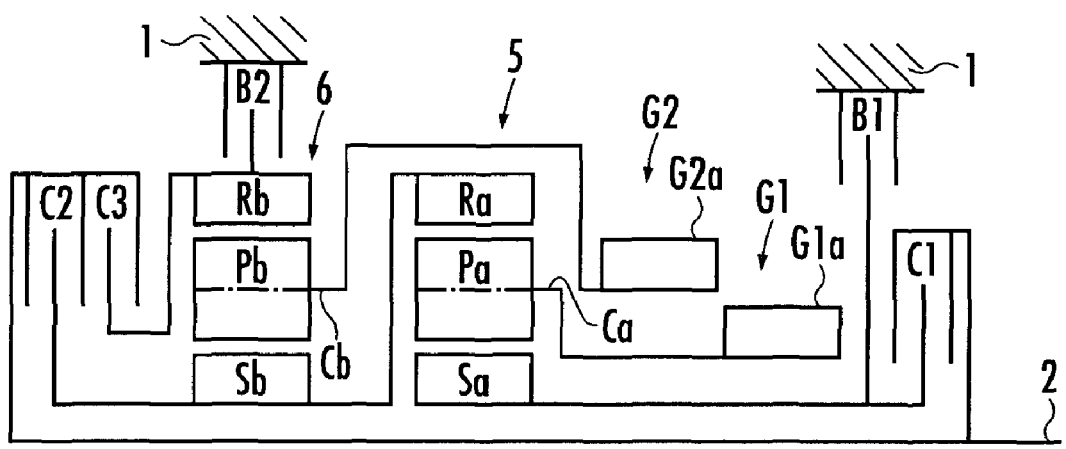
FIG. 16 is a skeletal view of the automatic transmission according to an eleventh embodiment of the present invention.

For example, as in a tenth embodiment shown in FIG. 15, the first planetary gear mechanism 5 and the first gear row G1 may be arranged between the first brake B1 and the second gear row G2. Further, as in an eleventh embodiment shown in FIG. 16, the first gear row G1, the second gear row G2, and the first planetary gear mechanism 5 may be arranged between the first brake B1 and the second brake B2.

Figure 17:
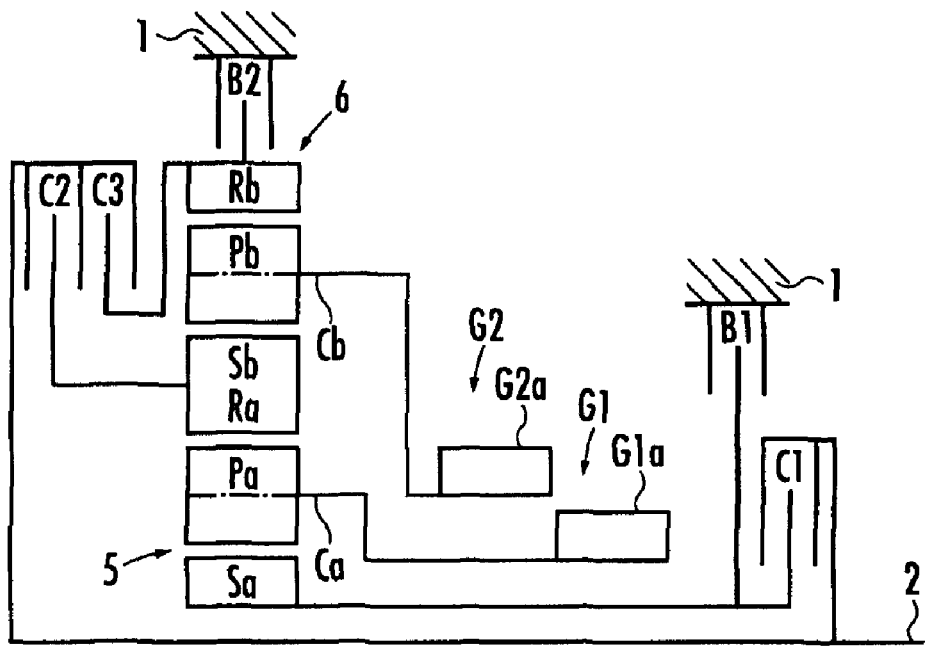
FIG. 17 is a skeletal view of the automatic transmission according to a twelfth embodiment of the present invention.

Further, as in a twelfth embodiment shown in FIG. 17, it is possible to arrange the second planetary gear mechanism 6 at an outer side in the diameter direction of the first planetary gear mechanism 5, configure the connected bodies Ra and Sb by uniting the ring gear Ra of the first planetary gear mechanism 5 and the sun gear Sb of the second planetary gear mechanism 6, so as to configure the compound planetary gear mechanism. By doing so, it is possible to further shorten the shaft length compared to that of the first embodiment.

Figure 18:
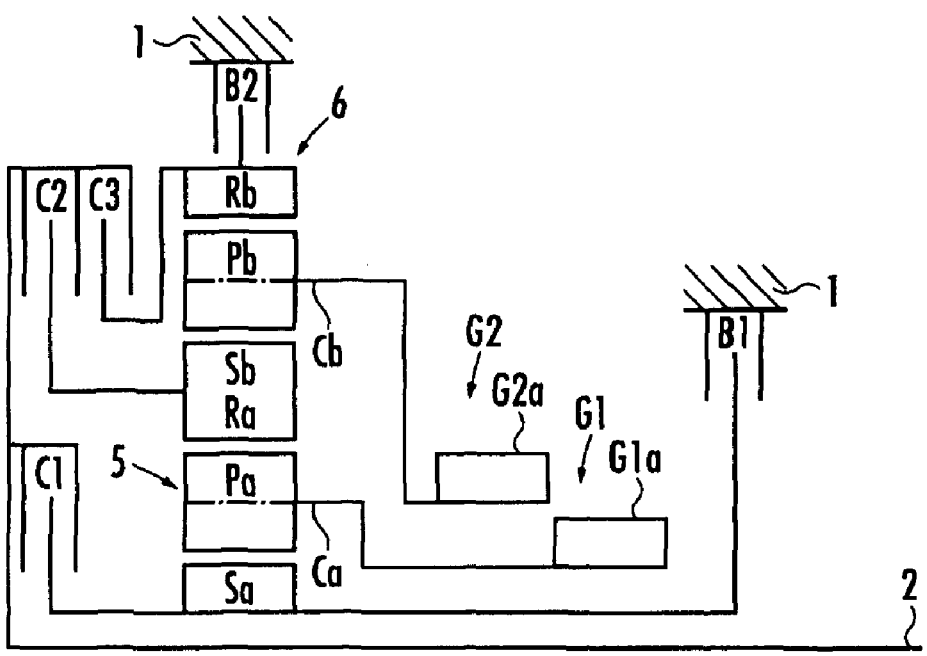
FIG. 18 is a skeletal view of the automatic transmission according to a thirteenth embodiment of the present invention.

Here, in the twelfth embodiment, the first clutch C1, the first brake B1, the first gear row G1, the second gear row G2, the first and second planetary gear mechanisms 5 and 6 and the second brake B2, the third clutch C3, and the second clutch C2 are arranged in this order from one end side of the input shaft 2. However, it is not limited thereto. For example, as in a thirteenth embodiment shown in FIG. 18, the first clutch C1 may be arranged on the other end side of the input shaft 2.

Further, in any of the ninth through thirteenth embodiments, a one-way clutch F1, which allows normal rotation (rotation in the forward direction of the vehicle) of the ring gear Rb of the second planetary gear mechanism 6 as the sixth element and prohibits reverse rotation (rotation in the reverse direction of the vehicle) thereof, may be provided to the transmission case 1 aligned with the second brake B2 as the fifth engagement mechanism.

By doing so, it is possible to make the rotational speed of the ring gear Rb of the second planetary gear mechanism 6 (the sixth element) "0" in the first gear speed from the function of the one-way clutch F1. Therefore, there is no need to engage the second brake B2 in the first gear speed, so that there is no need to release the second brake B2 during transmission from the first gear speed to the second gear speed. Therefore, by providing the one-way clutch F1, it is possible to carry out the transmission from the first gear speed to the second gear speed smoothly, so that the controllability of the transmission is improved.

Figure 19:
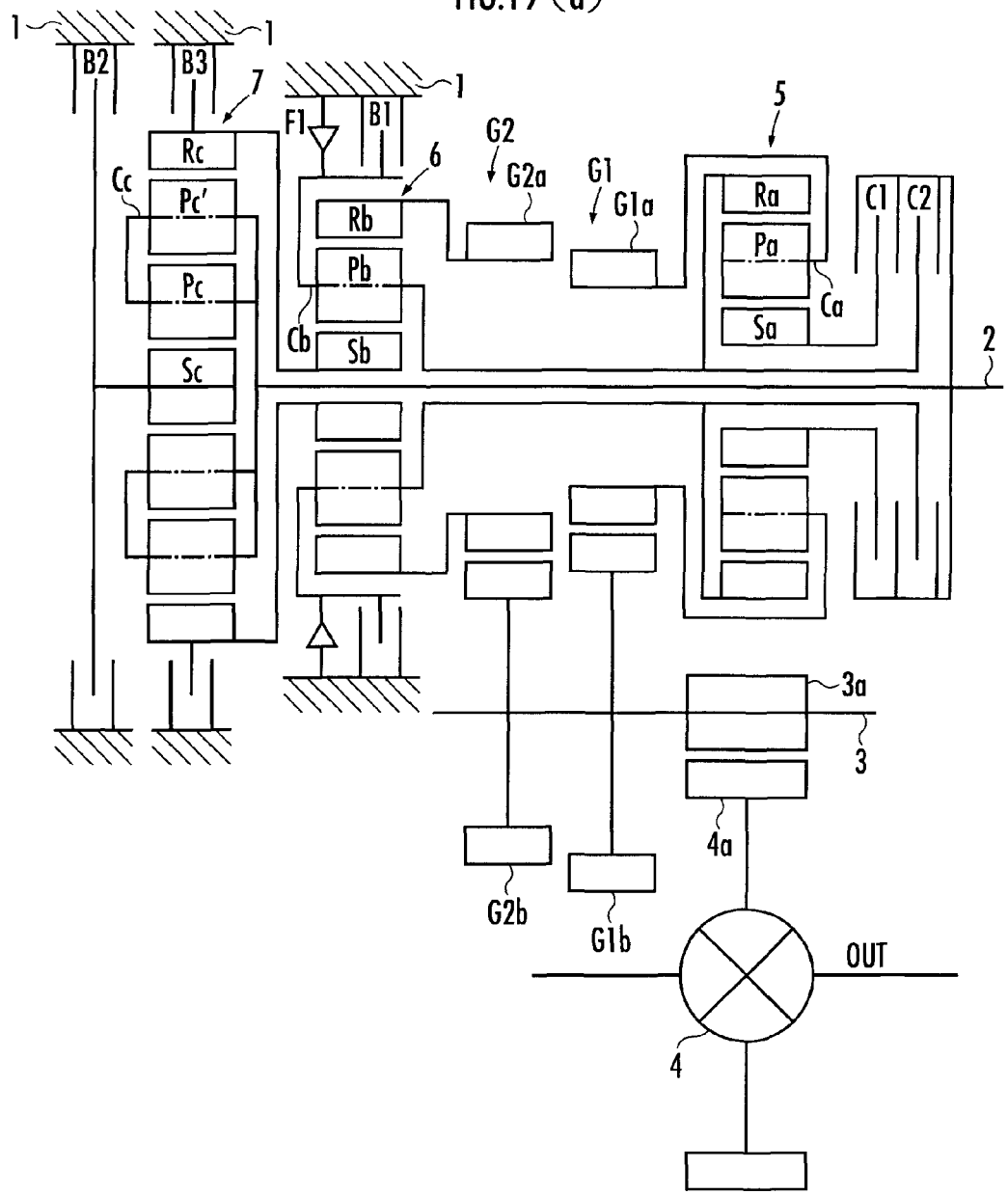
FIG. 19(a) is a skeletal view of the automatic transmission according to a fourteenth embodiment of the present invention.
FIG. 19(b) is a table collectively indicating the engagement condition of each engagement mechanism in each gear speed in the fourteenth embodiment.

FIG. 19(a) shows a fourteenth embodiment of the automatic transmission of the present invention. In the fourteenth embodiment, the automatic transmission is equipped with the input shaft 2 axially supported inside the transmission case 1 so that it is rotatable therein and coupled to the driving source such as the engine (not shown), and the output shaft 3 as the output member arranged in parallel to the input shaft 2. The rotation of the output shaft 3 is transmitted to the left and right driving wheels of the vehicle via the differential gear 4 fixed with the final driven gear 4a which is brought into meshed engagement with the output gear 3a fixed to the output shaft 3.

Further, inside the transmission case 1, the first planetary gear mechanism 5, the second planetary gear mechanism 6, and the third planetary gear mechanism 7 are arranged coaxially with the input shaft 2. The first planetary gear mechanism 5 is configured from the sun gear Sa, the ring gear Ra, the pinion Pa, and the carrier Ca. The pinion Pa is brought into meshed engagement with the sun gear Sa and the ring gear Ra, and is supported by the carrier Ca rotatably and revolvably. That is, the first planetary gear mechanism 5 is configured from the planetary gear mechanism of the single pinion type.

Figure 20:
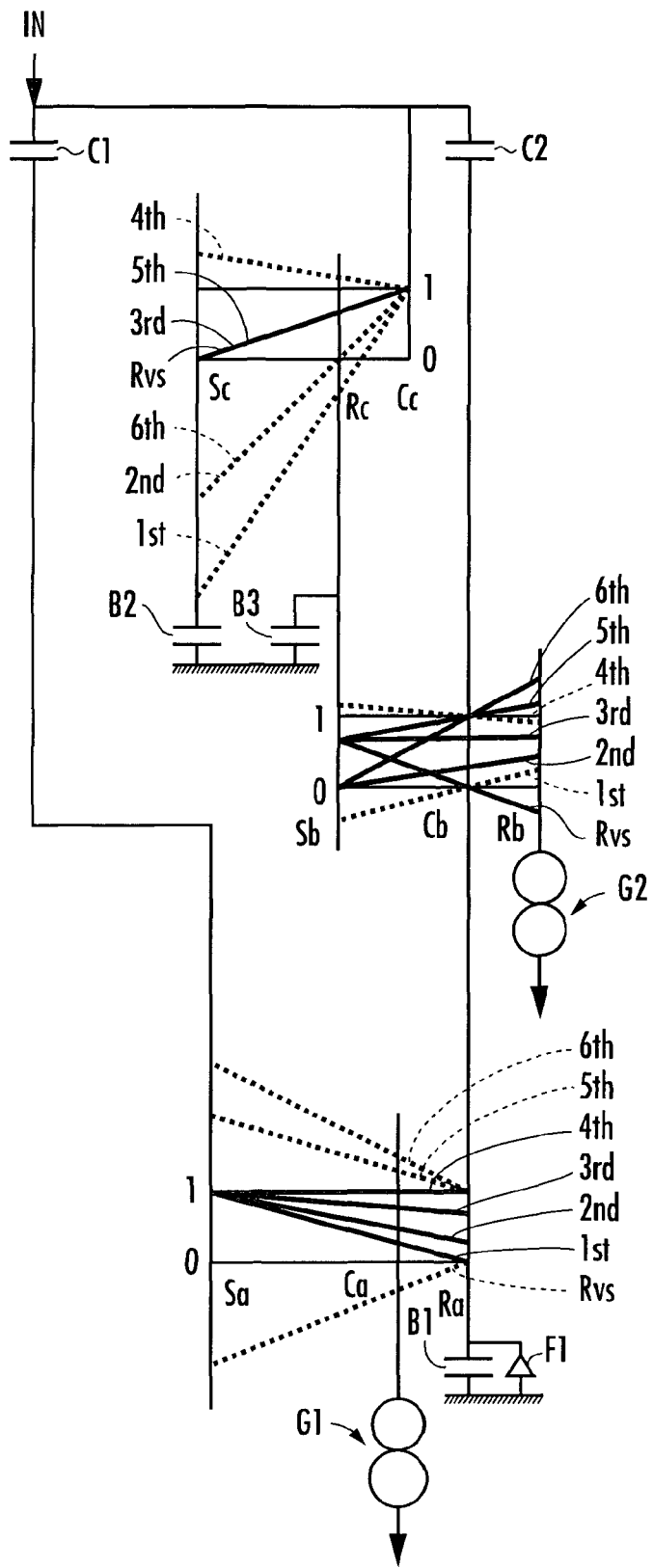
FIG. 20 is a velocity diagram of the first through third planetary gear mechanisms of the fourteenth embodiment.

At the bottom of FIG. 20, there is illustrated a velocity diagram of the first planetary gear mechanism 5. With reference to the velocity diagram, when three elements comprised of the sun gear Sa, the carrier Ca and the ring gear Ra of the first planetary gear mechanism 5 are taken from the left in the order of the distance corresponding to a gear ratio in the velocity diagram as the first element, the second element, and the third element, respectively, the first element becomes the sun gear Sa, the second element becomes the carrier Ca, and the third element becomes the ring gear Ra.

Here, the ratio of the distance between the sun gear Sa and the carrier Ca and the distance between the carrier Ca and the ring gear Ra is, when taking the gear ratio (number of teeth of the ring gear/number of teeth of the sun gear) of the first planetary gear mechanism 5 as "i", set to i:1. Here, in the velocity diagram, the lower horizontal line and the upper horizontal line respectively indicates a rotational speed of "0" and "1" (rotational speed equal to that of the input shaft 2).

The second planetary gear mechanism 6 is configured from, similarly to the first planetary gear mechanism 5, the sun gear Sb, the ring gear Rb, the pinion Pb, and the carrier Cb. The pinion Pb is brought into meshed engagement with the sun gear Sb and the ring gear Rb, and is supported by the carrier Cb rotatably and revolvably. That is, the second planetary gear mechanism 6 is also configured from a planetary gear mechanism of a single pinion type.

At the middle of FIG. 20, there is illustrated a velocity diagram of the second planetary gear mechanism 6. With reference to the velocity diagram, when three elements comprised of the sun gear Sb, the carrier Cb and the ring gear Rb of the second planetary gear mechanism 6 are taken from the left in the order of the distance corresponding to a gear ratio in the velocity diagram as the fourth element, the fifth element, and the sixth element, respectively, the fourth element becomes the sun gear Sb, the fifth element becomes the carrier Cb, and the sixth element becomes the ring gear Rb. Here, the ratio of the distance between the sun gear Sb and the carrier Cb and the distance between the carrier Cb and the ring gear Rb is, when taking the gear ratio of the second planetary gear mechanism 6 as "j", set to j:1.

The third planetary gear mechanism 7 is configured from the sun gear Sc, the ring gear Rc, a pair of pinions Pc and Pc', and the carrier Cc. The pair of pinions Pc and Pc' is brought into meshed engagement with each other, as well as one of the pinion Pc is brought into meshed engagement with the sun gear Sc and the other pinion Pc' is brought into meshed engagement with the ring gear Rc. Further, the pair of pinions Pc and Pc' is supported by the carrier rotatably and revolvably. That is, the third planetary gear mechanism 7 is configured from the planetary gear mechanism of the double pinion type.

At the top of FIG. 20, there is illustrated a velocity diagram of the third planetary gear mechanism 7. With reference to the velocity diagram, when three elements comprised of the sun gear Sc, the carrier Cc and the ring gear Rc of the third planetary gear mechanism 7 are taken from the left in the order of the distance corresponding to a gear ratio in the velocity diagram as a seventh element, an eighth element, and a ninth element, respectively, the seventh element becomes the sun gear Sc, the eighth element becomes the carrier Cc, and the ninth element becomes the ring gear Rc. Here, the ratio of the distance between the sun gear Sc and the carrier Cc and the distance between the carrier Cc and the ring gear Rc is, when taking the gear ratio of the third planetary gear mechanism 7 as "k", set to k:1.

The ring gear Ra (the third element) of the first planetary gear mechanism 5 and the carrier Cb (the fifth element) of the second planetary gear mechanism 6 are coupled to each other in order to configure a first connected bodies Ra and Cb. The sun gear Sb (the fourth element) of the second planetary gear mechanism 6 and the ring gear Rc (the eighth element) of the third planetary gear mechanism 7 are coupled to each other in order to configure a second connected bodies Sb and Rc.

The carrier Cc (the ninth element) of the third planetary gear mechanism 7 is coupled to the input shaft 2. The carrier Ca (the second element) of the first planetary gear mechanism 5 is coupled to the output shaft 3 via the first gear row G1 comprised of the driving gear G1$a$ fixed to the carrier Ca and the driven gear G1$b$ fixed to the output shaft 3 and brought into meshed engagement with the driving gear G1$a$. The ring gear Rb (the sixth element) of the second planetary gear mechanism 6 is coupled to the output shaft 3 via the second gear row G2 comprised of the driving gear G2$a$ fixed to the ring gear Rb and the driven gear G2$b$ fixed to the output shaft 3 and brought into meshed engagement with the driving gear G2$a$.

Here, when the gear ratio (number of teeth of the driven gear/number of teeth of the driving gear) of the first gear row G1 is taken as p, the gear ratio of the second gear row G2 is taken as q, it is set to become p>q. Further, the carrier Ca of the first planetary gear mechanism 5 and the ring gear Rb of the second planetary gear mechanism 6 are coupled to the output shaft 3 via both gear rows G1 and G2. As such, the ring gear Rb of the second planetary gear mechanism 6 rotates at the speed of q/p of the rotational speed of the carrier Ca of the first planetary gear mechanism 5.

In the fourteenth embodiment, the automatic transmission is equipped with the first clutch C1 as the first engagement mechanism, the second clutch C2 as the second engagement mechanism, the first brake B1 as the third engagement mechanism, the second brake B2 as the fourth engagement mechanism, and the third brake B3 as the fifth engagement mechanism.

The first clutch C1 couples the sun gear Sa (the first element) of the first planetary gear mechanism 5 with the input shaft 2 releasably. The second clutch C2 couples the first connected bodies Ra and Cb (the third element and the fifth element) with the input shaft 2 releasably.

The first brake B1 fixes the first connected bodies Ra and Cb (the third element and the fifth element) to the transmission case 1 releasably. The second brake B2 fixes the sun gear Sc (the seventh element) of the third planetary gear mechanism 7 to the transmission case 1 releasably. The third brake B3 fixes the second connected bodies Sb and Rc (the fourth element and the eighth element) to the transmission case 1 releasably. Here, the one-way clutch F1, which allows normal rotation (rotation in the forward direction of the vehicle) of the first connected bodies Ra and Cb and prohibits reverse rotation thereof, is coupled to the transmission case 1 in parallel to the first brake B1. Each engagement mechanism is controlled by a transmission control unit (TCU) not shown.

In the fourteenth embodiment, in order to establish a first gear speed, the TCU engages the first clutch C1. By doing so, the rotational speed of the sun gear Sa of the first planetary gear mechanism 5 becomes "1", and the rotational speed of the ring gear Ra of the first planetary gear mechanism 5 becomes "0" by the function of the one-way clutch F1, so that the velocity line of the first planetary gear mechanism 5 becomes a line indicated by "1st" in FIG. 20.

Then, the rotational speed of the carrier Ca of the first planetary gear mechanism 5 becomes 1/(i+1), the output shaft 3 rotates at the speed of 1/{(i+1)p} via the first gear row G1, so that the first gear speed is established. Here, when the first brake B1 is engaged in addition to the first clutch C1, the first gear speed is established in the state enabling the engine brake to work.

In order to establish a second gear speed, the TCU engages the first clutch C1 and the third brake B3. By doing so, the rotational speed of the sun gear Sa of the first planetary gear mechanism 5 becomes "1", and the rotational speed of the sun gear Sb of the second planetary gear mechanism 6 becomes "0". Further, the ring gear Ra of the first planetary gear mechanism 5 and the carrier Cb of the second planetary gear mechanism 6 rotate at a uniform velocity, the ring gear Rb of the second planetary gear mechanism 6 rotates at a speed of q/p the rotational speed of the carrier Ca of the first planetary gear mechanism 5.

As such, the velocity lines of the first planetary gear mechanism 5 and the second planetary gear mechanism 6 become lines indicated by "2nd" in FIG. 20. Then, the rotational speed of the carrier Ca of the first planetary gear mechanism 5 becomes (j+1)p/{(i+1) (j+1)p−ijq}, the rotational speed of the ring gear Rb of the second planetary gear mechanism 6 becomes (j+1)q/{(i+1) (j+1)p−ijq}, and the output shaft 3 rotates at the speed of (j+1)/{(i+1) (j+1)p−ijq}, so that the second gear speed is established.

In order to establish a third gear speed, the TCU engages the first clutch C1 and the second brake B2. By doing so, the rotational speed of the sun gear Sa of the first planetary gear mechanism 5 and the rotational speed of the carrier Cc of the third planetary gear mechanism 7 both become "1", and the rotational speed of the sun gear Sc of the third planetary gear mechanism 7 becomes "0". Further, the ring gear Ra of the first planetary gear mechanism 5 and the carrier Cb of the second planetary gear mechanism 6 rotate at a uniform velocity, the ring gear Rb of the second planetary gear mechanism 6 rotates at a speed of q/p the rotational speed of the carrier Ca of the first planetary gear mechanism 5, so that the velocity lines of the first planetary gear mechanism 5, the second planetary gear mechanism 6 and the third planetary gear mechanism 7 become lines indicated by "3rd" in FIG. 20.

Then, the rotational speed of the carrier Ca of the first planetary gear mechanism 5 becomes $\{k(j+1)+i(k-1)\}p/\{(i+1)(j+1)kp-ijkq\}$, the rotational speed of the ring gear Rb of the second planetary gear mechanism 6 becomes $\{k(j+1)+i(k-1)q/\{(i+1)(j+1)kp-ijkq\}$, and the output shaft 3 rotates at the speed of $\{k(j+1)+i(k-1)\}/\{(i+1)(j+1)kp-ijkq\}$, so that the third gear speed is established.

In order to establish a fourth gear speed, the TCU engages the first clutch C1 and the second clutch C2. By doing so, the rotational speed of the sun gear Sa of the first planetary gear mechanism 5 and the rotational speed of the ring gear Ra of the first planetary gear mechanism 5 both become "1", and the first planetary gear mechanism 5 is in a locked state. Then, the velocity line of the first planetary gear mechanism 5 becomes a line indicated by "4th" in FIG. 20, the rotational speed of the carrier Ca of the first planetary gear mechanism 5 becomes "1", and the output shaft 3 rotates at a speed of 1/p, so that the fourth gear speed is established.

In order to establish a fifth gear speed, the TCU engages the second clutch C2 and the second brake B2. By doing so, the rotational speed of the carrier Cb of the second planetary gear mechanism 6 and the rotational speed of the carrier Cc of the third planetary gear mechanism 7 both become "1" and the rotational speed of the sun gear Sc of the third planetary gear mechanism 7 becomes "0". Further, the sun gear Sb of the second planetary gear mechanism 6 and the ring gear Rc of the third planetary gear mechanism 7 constituting the second connected body Sb and Rc rotate at a uniform velocity. Then, the velocity lines of the second planetary gear mechanism 6 and the third planetary gear mechanism 7 become lines indicated by "5th" in FIG. 20, the rotational speed of the ring gear Rb of the second planetary gear mechanism 6 becomes (1+jk)/(jk), and the output shaft 3 rotates at the speed of (1+jk)/(jkq), so that the fifth gear speed is established.

In order to establish a sixth gear speed, the TCU engages the second clutch C2 and the third brake B3. By doing so, the rotational speed of the sun gear Sb of the second planetary gear mechanism 6 becomes "0", the rotational speed of the carrier Cb of the second planetary gear mechanism 6 becomes "1", so that the velocity line of the second planetary gear mechanism 6 becomes a line indicated by "6th" in FIG. 20. Then, the rotational speed of the ring gear Rb of the second planetary gear mechanism 6 becomes (j+1)/j, and the output shaft 3 rotates at a speed of (j+1)/(jq), so that the sixth gear speed is established.

In order to establish a reverse gear speed, the TCU engages the first brake B1 and the second brake B2. By doing so, the rotational speed of the carrier Cb of the second planetary gear mechanism 6 and the rotational speed of the sun gear Sc of the third planetary gear mechanism 7 both become "0", so that the velocity lines of the second planetary gear mechanism 6 and the third planetary gear mechanism 7 become lines indicated by "Rvs" in FIG. 20. Then, the rotational speed of the ring gear Rb of the second planetary gear mechanism 6 becomes −(k−1)/jk, and the output shaft 3 rotates at a speed of −(k−1)/(jkq), so that the reverse gear speed is established.

The velocity lines indicated by dotted line in FIG. 20 represents that, of the first through third planetary gear mechanisms 5, 6 and 7, each element of the other planetary gear mechanisms are rotating following the one planetary gear mechanism which is conducting power transmission.

FIG. 19(b) is a table collectively indicating the relationship between each of the gear speed and the engagement condition of the clutches C1 and C2, the brakes B1, B2 and B3, and the one-way clutch F1 explained above, and "o" represents engagement. Further, FIG. 19(b) shows a gear ratio (the rotational speed of the input shaft 2/the rotational speed of the output shaft 3) of each gear speed, when the gear ratio i of the first planetary gear mechanism 5 is set to 2.65, the gear ratio j of the second planetary gear mechanism 6 is set to 1.85, the gear ratio k of the third planetary gear mechanism 7 is set to 3.00, the gear ratio p of the first gear row G1 is set to 1.10, and the gear ratio q of the second gear row G2 is set to 1.00. According thereto, a common ratio (ratio of the gear ratios between each gear speed) is set appropriately, and as well as a ratio range (the first gear ratio/the sixth gear ratio) is set appropriately.

FIG. 21 indicates the meshed transmission efficiency of each gear speed in the fourteenth embodiment. In FIG. 21, the meshed transmission efficiency (%) is indicated at the left column of the fourteenth embodiment, and the difference between the transmission efficiency of the fourteenth embodiment and that of the prior art is indicated at the right column. When comparing the meshed transmission efficiency of each gear speed of the fourteenth embodiment with that of the prior art, as is indicated in the right column, the efficiency is decreased by 0.3% in the second gear speed, but it is greatly improved in the third gear speed, fifth gear speed and the sixth gear speed, so that the average of the forward gear speed is improved by 0.57% than that of the prior art.

Here, in the fourteenth embodiment, the second clutch C2, the first clutch C1, the first planetary gear mechanism 5, the first gear row G1, the second gear row G2, the second planetary gear mechanism 6 and the first brake B1, the one-way clutch F1, the third planetary gear mechanism 7 and the third brake B3, and the second brake B2 are arranged in this order from one end side around the input shaft 2. However, it is not limited thereto. For example, as in a fifteenth embodiment shown in FIG. 22, the first planetary gear 5 and the first gear row G1 may be arranged between the first clutch C1 and the second gear row G2.

Further, as is in a sixteenth embodiment shown in FIG. 23, the first gear row G1, the first planetary gear mechanism 5, the first clutch C1, the second clutch C2, the second gear row G2, the second planetary gear mechanism 6 and the first brake B1, the one-way clutch F1, the third planetary gear mechanism 7 and the third brake B3, and the second brake B2 may be arranged in this order from one end side of the input shaft 2.

Further, in the fourteenth embodiment, the first and the second planetary gear mechanisms 5 and 6 are configured from the planetary gear mechanism of the single pinion type, and the third planetary gear mechanism 7 is configured form the planetary gear mechanism of the double pinion type. However, it is possible to configure the first planetary gear mechanism 5 and the second planetary gear mechanism 6 from the planetary gear mechanism of the double pinion type. Further, it is possible to configure the third planetary gear mechanism 7 from the planetary gear mechanism of the single pinion type.

When the first planetary gear mechanism 5 is configured from the planetary gear mechanism of the double pinion type, either one of the sun gear and the carrier becomes the first element, the ring gear becomes the second element, and the other one of the sun gear and the carrier becomes the third element. Further, when the second planetary gear mechanism 6 is configured from the planetary gear mechanism of the double pinion type, either one of the sun gear and the carrier becomes the fourth element, the ring gear becomes the fifth element, and the other one of the sun gear and the carrier becomes the sixth element. Still further, when the third planetary gear mechanism 7 is configured from the planetary gear mechanism of the single pinion type, either one of the sun gear and the ring gear becomes the seventh element, the carrier becomes the eighth mechanism, and the other one of the sun gear and the ring gear becomes the ninth element.

Figure 24:
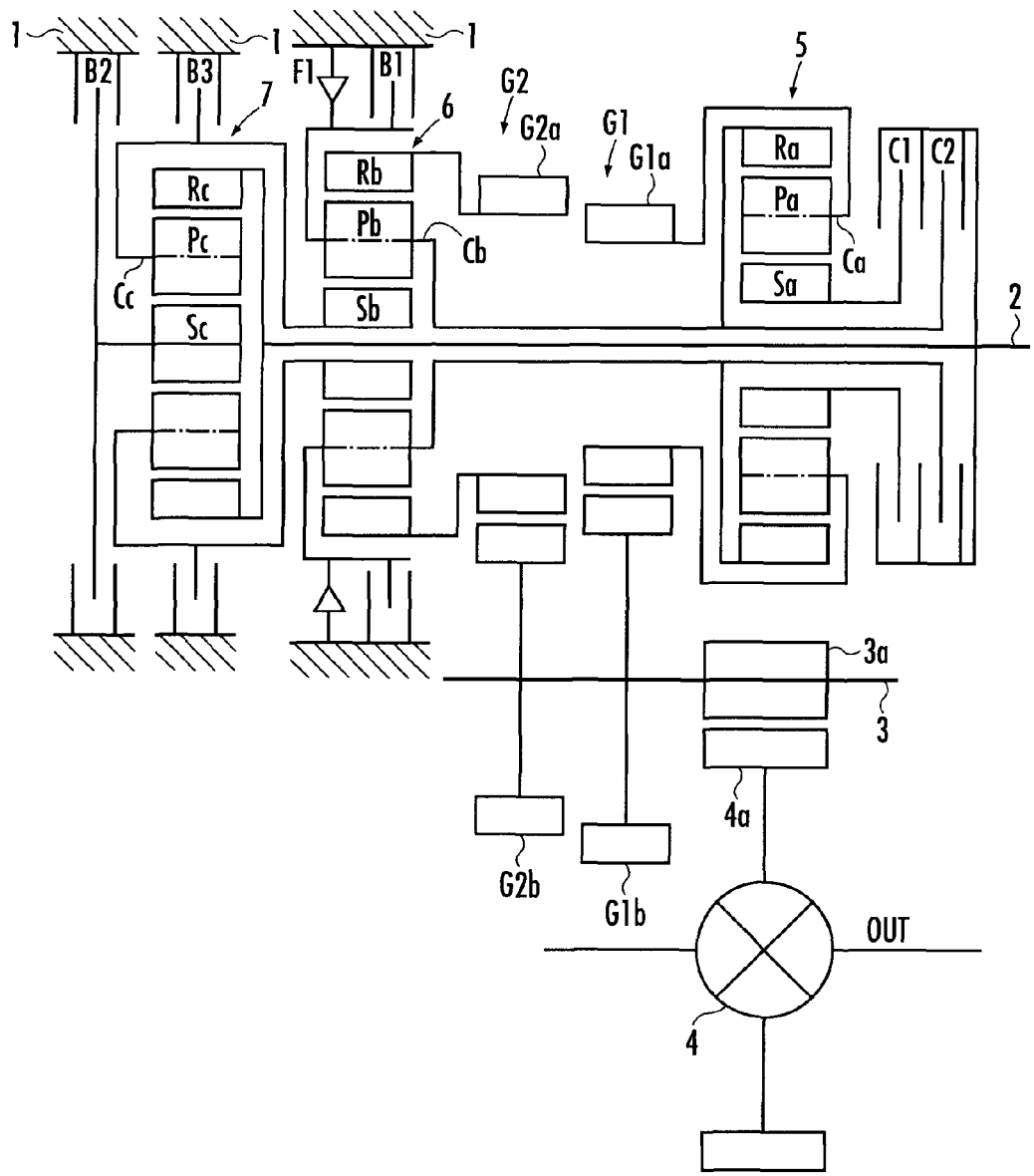
FIG. 24(a) is a skeletal view of a seventeenth embodiment of the automatic transmission of the present invention.
FIG. 24(b) is a table collectively indicating the engagement condition of each engagement mechanism in each gear speed in the seventeenth embodiment.
Figure 25:
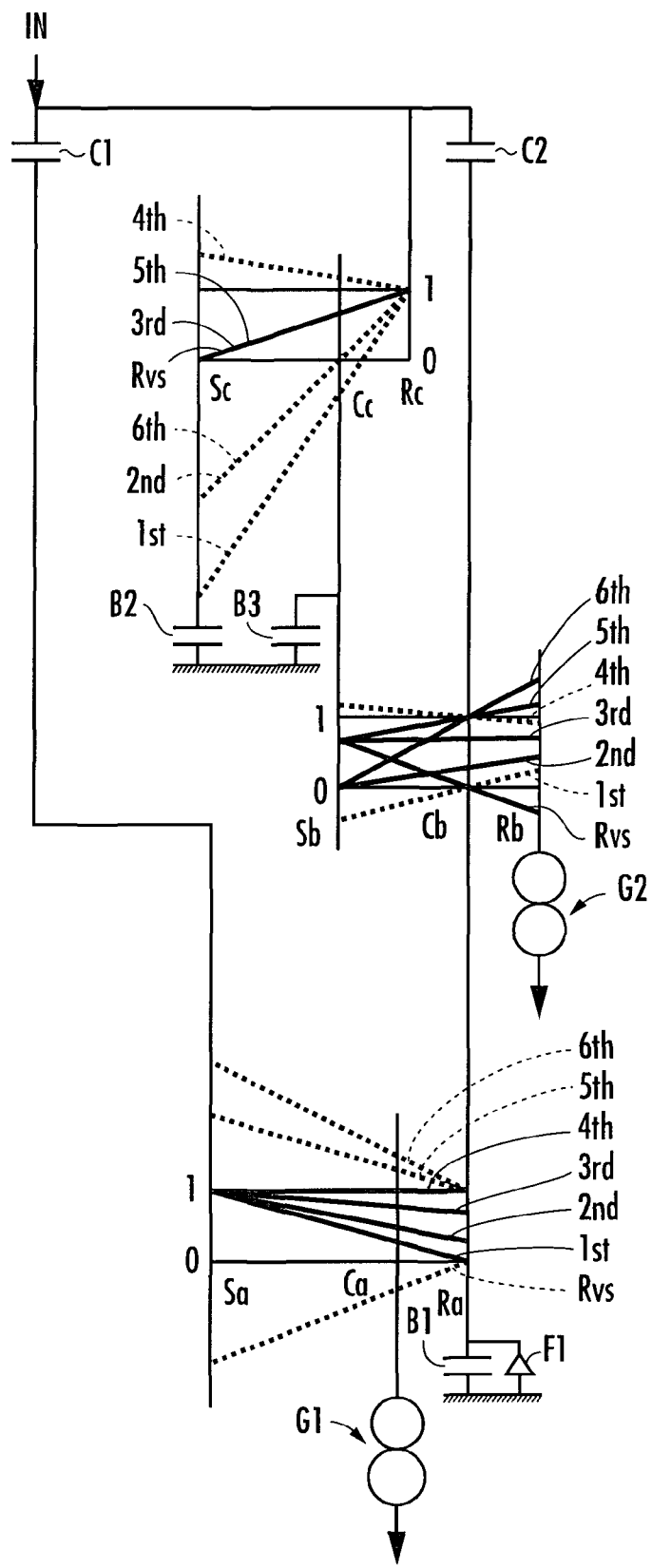
FIG. 25 is a velocity diagram of the first through third planetary gear mechanisms of the seventeenth embodiment.

As is in a seventeenth embodiment shown in FIG. 24(a), when the third planetary gear mechanism 7 is configured from the planetary gear mechanism of the single pinion type, the number of meshed engagement when the third planetary gear mechanism 7 is used for power transmission is decreased, so that it is possible to improve the meshed transmission efficiency further. In the seventeenth embodiment, as is shown in FIG. 25, the carrier Cc of the third planetary gear mechanism 7 becomes the eighth element, and the ring gear Rc thereof becomes the ninth element. FIG. 24(b) shows the gear ratio (the rotational speed of the input shaft 2/the rotational speed of the output shaft 3) of each gear speed, when the gear ratio k of the third planetary gear mechanism 7 is set to 2.00, and all other gear ratios are set to be the same as in the fourteenth embodiment. According thereto, a common ratio (ratio of the gear ratios between each gear speed) is set appropriately, and as well as a ratio range (the first gear ratio/the sixth gear ratio) is set appropriately.

FIG. 21 indicates the meshed transmission efficiency of each gear speed in the seventeenth embodiment. When comparing the meshed transmission efficiency of each gear speed of the seventeenth embodiment with that of the prior art, the efficiency is decreased by 0.3% in the second gear speed, but it is greatly improved in the third gear speed, the fifth gear speed and the sixth gear speed, so that the average of the forward gear speed is improved by 0.65% than that of the prior art.

Figure 26:
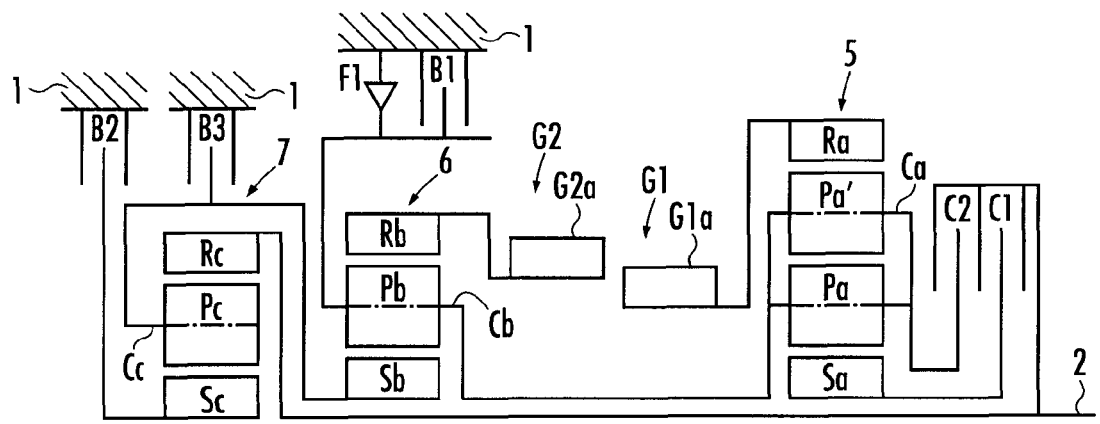
FIG. 26 is a skeletal view of the automatic transmission according to an eighteenth embodiment of the preset invention.
Figure 27:
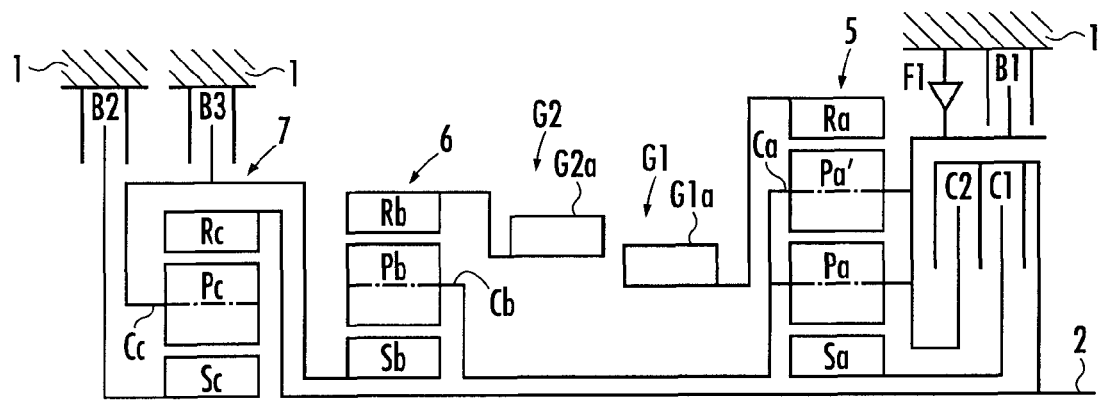
FIG. 27 is a skeletal view of the automatic transmission according to a nineteenth embodiment of the present invention.

Further, as in an eighteenth embodiment shown in FIG. 26, the first planetary gear mechanism 5 in the seventeenth embodiment may be configured from the planetary gear mechanism of the double pinion type. Also, as in a nineteenth embodiment shown in FIG. 27, the first brake B1 as the third engagement mechanism for fixing the first connected bodies Ca and Cb in the eighteenth embodiment to the transmission case 1 releasably, and the one-way clutch F1 which allows normal rotation of the first connected bodies Ca and Cb and prohibits reverse rotation thereof, may be arranged at the position of the first clutch C1 and the second clutch C2.

Figure 28:
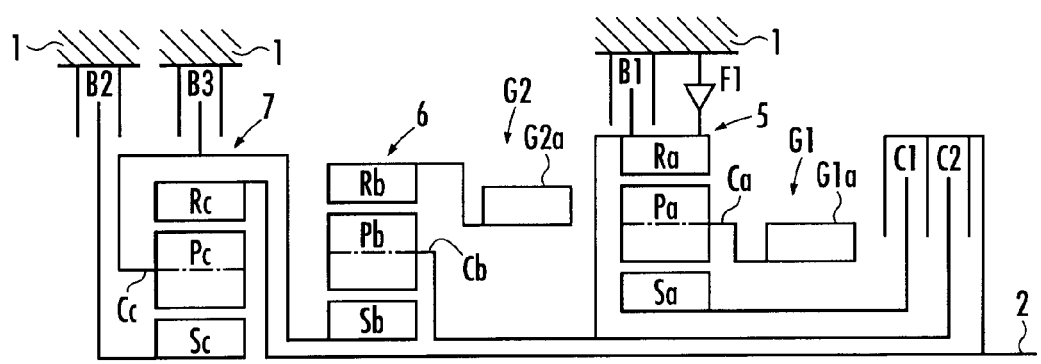
FIG. 28 is a skeletal view of the automatic transmission according to a twentieth embodiment of the present invention.
Figure 29:
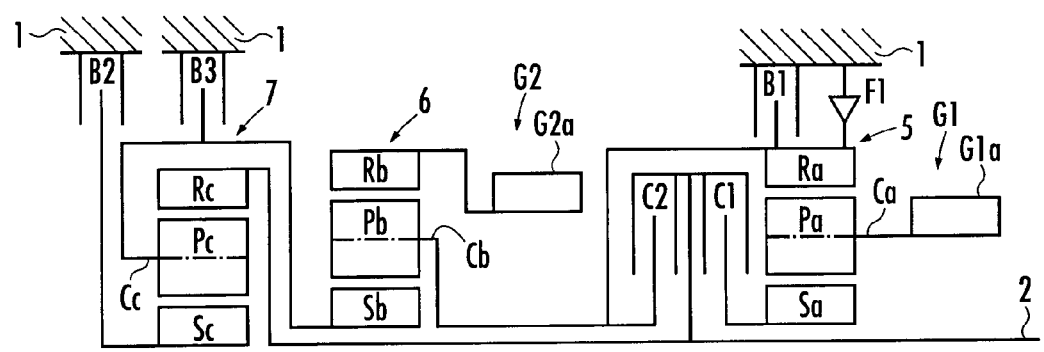
FIG. 29 is a skeletal view of the automatic transmission according to a twenty-first embodiment of the present invention.

Further, as in a twentieth embodiment shown in FIG. 28, the first gear row G1 of the seventeenth embodiment may be arranged between the first clutch C1 and the first planetary gear mechanism 5, and the first brake B1 as the third engagement mechanism and the one-way clutch F1 may be arranged in an outer side in the diameter direction of the first planetary gear mechanism 5. Still further, as in a twenty-first embodiment shown in FIG. 29, the first clutch C1 and the second clutch C2 of the twentieth embodiment may be arranged between the first planetary gear mechanism 5 and the second gear row G2.

Next, explanation will be given on a twenty-second embodiment shown in FIG. 30(a). The twenty-second embodiment is a transmission in which the third clutch C3 as the sixth engagement mechanism is added to the seventeenth embodiment. The third clutch C3 couples the second coupled bodies Sb and Cc which is obtained by coupling the sun gear Sb as the fourth element of the second planetary gear mechanism 6 and the carrier Cc as the eighth element of the third planetary gear mechanism 7 with the input shaft 2 releasably. Other configurations are the same as in the seventeenth embodiment.

Figure 31:
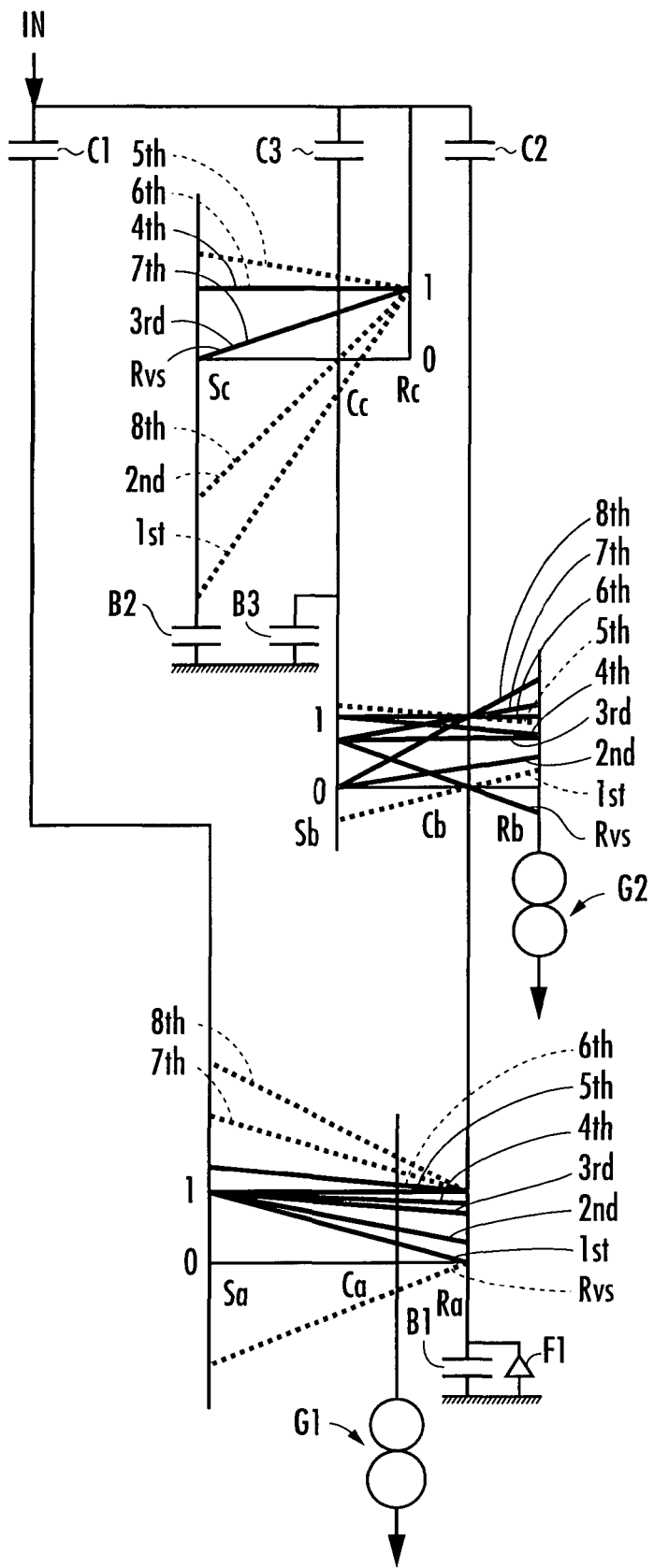
FIG. 31 is a velocity diagram of the first through third planetary gear mechanisms of the twenty-second embodiment.

In the twenty-second embodiment, in order to establish a first gear speed, the TCU engages the first clutch C1. By doing so, the rotational speed of the sun gear Sa of the first planetary gear mechanism 5 becomes "1", and the rotational speed of the ring gear Ra of the first planetary gear mechanism 5 becomes "0" by the function of the one-way clutch F1, so that the velocity line of the first planetary gear mechanism 5 becomes a line indicated by "1st" in FIG. 31.

Then, the rotational speed of the carrier Ca of the first planetary gear mechanism 5 becomes $1/(i+1)$, the output shaft 3 rotates at the speed of $1/\{(i+1)p\}$ via the first gear row G1, so that the first gear speed is established. Here, when the first brake B1 is engaged in addition to the first clutch C1, the first gear speed is established in the state enabling the engine brake to work.

In order to establish a second gear speed, the TCU engages the first clutch C1 and the third brake B3. By doing so, the rotational speed of the sun gear Sa of the first planetary gear mechanism 5 becomes "1", and the rotational speed of the sun gear Sb of the second planetary gear mechanism 6 becomes "0". Further, the ring gear Ra of the first planetary gear mechanism 5 and the carrier Cb of the second planetary gear mechanism 6 rotate at a uniform velocity, the ring gear Rb of the second planetary gear mechanism 6 rotates at a speed of $q/p$ the rotational speed of the carrier Ca of the first planetary gear mechanism 5, so that the velocity lines of the first planetary gear mechanism 5 and the second planetary gear mechanism 6 become lines indicated by "2nd" in FIG. 31.

Then, the rotational speed of the carrier Ca of the first planetary gear mechanism 5 becomes $(j+1)p/\{(i+1)(j+1)p-ijq\}$, the rotational speed of the ring gear Rb of the second planetary gear mechanism 6 becomes $(j+1)q/\{(i+1)(j+1)p-ijq\}$, and the output shaft 3 rotates at the speed of $(j+1)/\{(i+1)(j+1)p-ijq\}$, so that the second gear speed is established.

In order to establish a third gear speed, the TCU engages the first clutch C1 and the second brake B2. By doing so, the rotational speed of the sun gear Sa of the first planetary gear mechanism 5 and the rotational speed of the ring gear Rc of the third planetary gear mechanism 7 both become "1", and the rotational speed of the sun gear Sc of the third planetary gear mechanism 7 becomes "0". Further, the ring gear Ra of the first planetary gear mechanism 5 and the carrier Cb of the second planetary gear mechanism 6 rotate at a uniform velocity, the ring gear Rb of the second planetary gear mechanism 6 rotates at a speed of $q/p$ the rotational speed of the carrier Ca of the first planetary gear mechanism 5, so that the velocity lines of the first planetary gear mechanism 5, the second planetary gear mechanism 6 and the third planetary gear mechanism 7 become lines indicated by "3rd" in FIG. 31.

Then, the rotational speed of the carrier Ca of the first planetary gear mechanism 5 becomes $\{(j+1)(k+1)+ik\}p/\{(i+1)(j+1)(k+1)p-(k+1)ijq\}$, the rotational speed of the ring gear Rb of the second planetary gear mechanism 6 becomes $\{(j+1)(k+1)+ik\}q/\{(i+1)(j+1)(k+1)p-(k+1)ijq\}$, and the output shaft 3 rotates at the speed of $\{(j+1)(k+1)+ik\}/\{(i+1)(j+1)(k+1)p-(k+1)ijq\}$, so that the third gear speed is established.

In order to establish a fourth gear speed, the TCU engages the first clutch C1 and the third clutch C3. By doing so, the rotational speed of the sun gear Sa of the first planetary gear mechanism 5 and the rotational speed of the sun gear Sb of the second planetary gear mechanism 6 both become "1". Further, the ring gear Ra of the first planetary gear mechanism 5 and the carrier Cb of the second planetary gear mechanism 6 rotate at a uniform velocity, the ring gear Rb of the second planetary gear mechanism 6 rotates at a speed of $q/p$ the rotational speed of the carrier Ca of the first planetary gear mechanism 5, so that the velocity lines of the first planetary gear mechanism 5, the second planetary gear mechanism 6 and the third planetary gear mechanism 7 become lines indicated by "4th" in FIG. 31.

Then, the rotational speed of the carrier Ca of the first planetary gear mechanism 5 becomes $(i+j+1)p/\{(i+1)(j+1)p-ijq\}$, the rotational speed of the ring gear Rb of the second planetary gear mechanism 6 becomes $(i+j+1)q/\{(i+1)(j+1)p-ijq\}$, and the output shaft 3 rotates at the speed of $(i+j+1)/\{(i+1)(j+1)p-ijq\}$, so that the fourth gear speed is established.

In order to establish a fifth gear speed, the TCU engages the first clutch C1 and the second clutch C2. By doing so, the rotational speed of the sun gear Sa of the first planetary gear mechanism 5 and the rotational speed of the ring gear Ra of the first planetary gear mechanism 5 both become "1", and the first planetary gear mechanism 5 is in a locked state, so that the velocity line of the first planetary gear mechanism 5 becomes a line indicated by "5th" in FIG. 31. Further, the rotational speed of the carrier Ca of the first planetary gear mechanism 5 becomes "1", and the output shaft 3 rotates at a speed of $1/p$, so that the fifth gear speed is established.

In order to establish a sixth gear speed, the TCU engages the second clutch C2 and the third clutch C3. By doing so, the rotational speed of the sun gear Sb of the second planetary gear mechanism 6 and the carrier Cb of the second planetary gear mechanism 6 both become "1", and the second planetary gear mechanism 6 is in a locked state, so that the velocity line of the second planetary gear mechanism 6 becomes a line indicated by "6th" in FIG. 31. Further, the rotational speed of the ring gear Rb of the second planetary gear mechanism 6 becomes "1", and the output shaft 3 rotates at a speed of $1/q$, so that the sixth gear speed is established.

In order to establish a seventh gear speed, the TCU engages the second clutch C2 and the second brake B2. By doing so, the rotational speed of the carrier Cb of the second planetary gear mechanism 6 and the rotational speed of the ring gear Rc of the third planetary gear mechanism 7 both become "1", and the rotational speed of the sun gear Sc of the third planetary gear mechanism 7 becomes "0", so that the velocity lines of the second planetary gear mechanism 6 and the third planetary gear mechanism 7 become lines indicated by "7th" in FIG. 31. Then, the rotational speed of the ring gear Rb of the second planetary gear mechanism 6 becomes $\{j(k+1)+1\}/\{j(k+1)\}$, the output shaft 3 rotates at the speed of $\{j(k+1)+1\}/\{j(k+1)q\}$, so that the seventh gear speed is established.

In order to establish an eighth gear speed, the TCU engages the second clutch C2 and the third brake B3. By doing so, the rotational speed of the sun gear Sb of the second planetary gear mechanism 6 becomes "0", and the rotational speed of the carrier Cb of the second planetary gear mechanism 6 becomes "1", so that the velocity line of the second planetary gear mechanism 6 becomes a line indicated by "8th" in FIG. 31. Then, the rotational speed of the ring gear Rb of the second planetary gear mechanism 6 becomes $(j+1)/j$, the output shaft 3 rotates at the speed of $(j+1)/(jq)$, so that the eighth gear speed is established.

In order to establish a reverse gear speed, the TCU engages the first brake B1 and the second brake B2. By doing so, the rotational speed of the carrier Cb of the second planetary gear mechanism 6 and the rotational speed of the sun gear Sc of the third planetary gear mechanism 7 both become "0", so that the velocity lines of the second planetary gear mechanism 6 and the third planetary gear mechanism 7 become lines indicated by "Rvs" in FIG. 31. Then, the rotational speed of the ring gear Rb of the second planetary gear mechanism 6 becomes $-k/\{(k+1)j\}$, and the output shaft 3 rotates at a speed of $-k/\{(k+1)jq\}$, so that the reverse gear speed is established.

Figure 30:
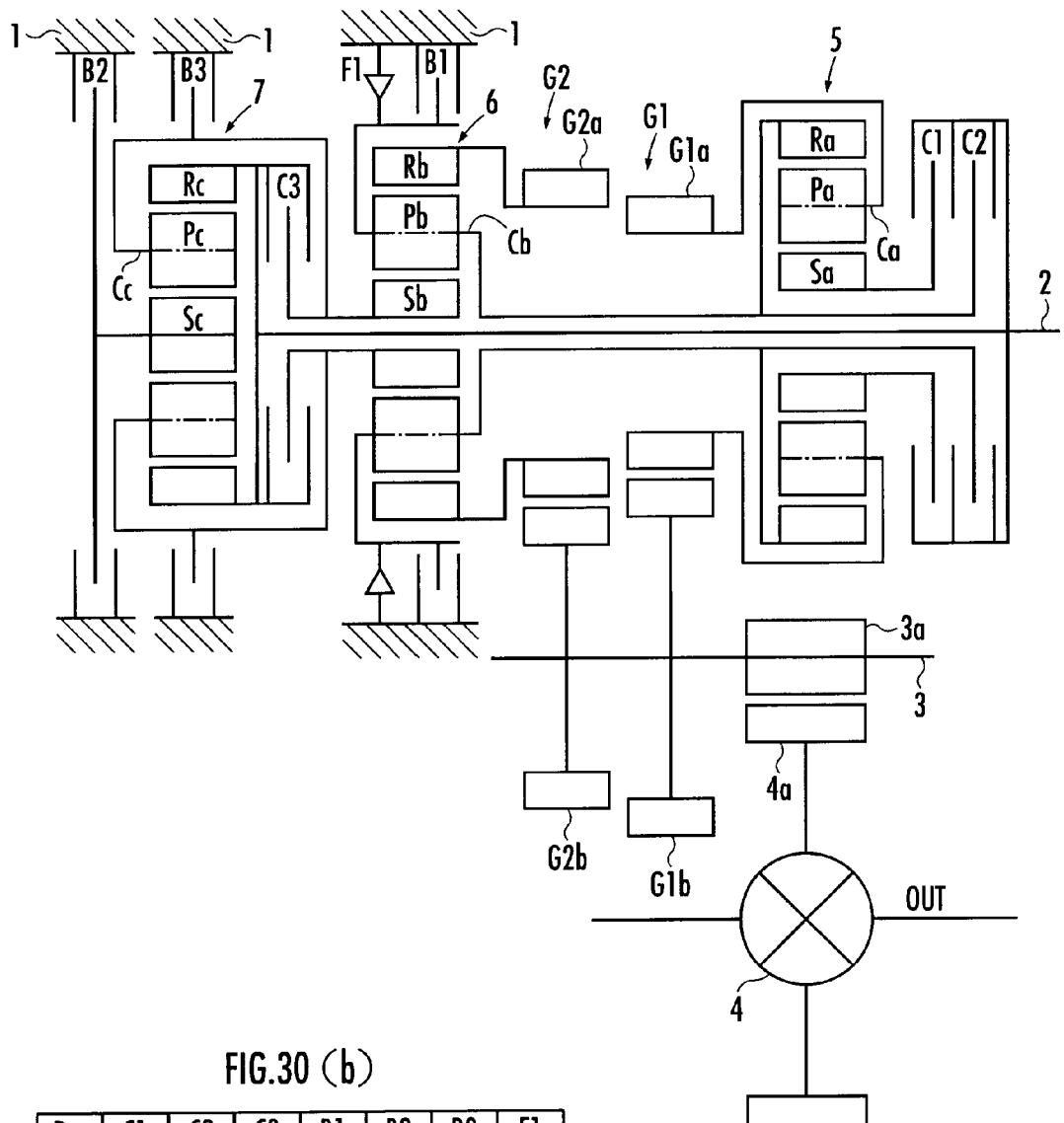
FIG. 30(a) is a skeletal view of the automatic transmission according to a twenty-second embodiment of the present invention.
FIG. 30(b) is a table collectively indicating the engagement condition of each engagement mechanism in each gear speed in the twenty-second embodiment.

FIG. 30(b) is a table collectively indicating the relationship between each of the gear speed and the engagement condition of the clutches C1, C2 and C3, the brakes B1, B2 and B3, and the one-way clutch F1 explained above, and "o" represents engagement. According to the twenty-second embodiment, it is possible to configure the transmission of eight gear speeds in the forward direction only by providing the third clutch C3.

Here, even in the twenty-second embodiment, it is possible to change the arranging position of each engagement mechanism or each gear row.

Further, the above-mentioned embodiments relates to the automatic transmission for front-wheel drive vehicle. However, when a propeller shaft is coupled to the output shaft in any of the embodiments, it could be used as the automatic transmission for a rear-wheel drive vehicle.

What is claimed is:

1. An automatic transmission which transmits rotation of an input shaft to an output member via a plurality of planetary gear mechanisms arranged concentric to the input shaft and by carrying out gear changes in a plurality of speeds, wherein:
   a plurality of the planetary gear mechanisms are each equipped with three elements comprised of a sun gear, a carrier, and a ring gear;
   a first element of one of the three elements of one of the plurality of planetary gear mechanisms is coupled to the input shaft;
   a second element of the elements of the plurality of planetary gear mechanisms is coupled to an output shaft, as the output member arranged in parallel to the input shaft, via a first gear row, and a third element, of the elements of the plurality of planetary gear mechanisms, is coupled to the output shaft via a second gear row differing in gear ratio from the first gear row; and
   wherein the automatic transmission further includes at least five engagement mechanisms each of which couples an element to another element, to the input shaft, or to a transmission case,
   and further wherein a first planetary gear mechanism and a second planetary gear mechanism are equipped as a plurality of the planetary gear mechanisms, and a first through fifth engagement mechanisms are equipped as the engagement mechanism,
   the three elements comprised of the sun gear, the carrier and the ring gear of the first planetary gear mechanism are taken in the order of the distance corresponding to a gear ratio in a velocity diagram as a first element, a second element and a third element, respectively, and the three elements comprised of the sun gear, the carrier and the ring gear of the second planetary gear mechanism are taken in the order of the distance corresponding to the gear ratio in the velocity diagram as a fourth element, a fifth element and a sixth element, respectively,
   the first element is coupled to the input shaft, the second element is coupled to the output shaft via the first gear row, and the sixth element is coupled to the output shaft via the second gear row,
   the first engagement mechanism couples the fourth element with the input shaft releasably,
   the second engagement mechanism couples the fifth element with the input shaft releasably,
   the third engagement mechanism couples the third element with the fifth element releasably,
   the fourth engagement mechanism fixes the fourth element to the transmission case releasably, and
   the fifth engagement mechanism fixes the fifth element to the transmission case releasably.

2. The automatic transmission according to claim 1, wherein
the first element is the sun gear of the first planetary gear mechanism, a third planetary gear mechanism having a ring gear which is united with the sun gear of the first planetary gear mechanism is arranged at an inner side in the diameter direction of the first planetary gear mechanism, the carrier of the third planetary gear mechanism is coupled to the fourth element, and the automatic transmission comprises a sixth engagement mechanism which fixes the sun gear of the third planetary gear mechanism to the transmission case releasably.

3. The automatic transmission according to claim 1, wherein
the sixth element is the ring gear of the second planetary gear mechanism, a third planetary gear mechanism having a sun gear which is united with the ring gear of the second planetary gear mechanism is arranged at an outer side in the diameter direction of the second planetary gear mechanism, the carrier of the third planetary gear mechanism is coupled to the fourth element, and the automatic transmission comprises a sixth engagement mechanism which fixes the ring gear of the third planetary gear mechanism to the transmission case releasably.

4. The automatic transmission according to claim 1, wherein
the fourth element is the sun gear of the second planetary gear mechanism, a third planetary gear mechanism having a ring gear which is united with the sun gear of the second planetary gear mechanism is arranged at an inner side in the diameter direction of the second planetary gear mechanism, the sun gear of the third planetary gear mechanism is coupled to the input shaft, and the automatic transmission comprises a sixth engagement mechanism which fixes the carrier of the third planetary gear mechanism to the transmission case releasably.

5. The automatic transmission according to claim 4, wherein
the first engagement mechanism couples the carrier of the third planetary gear mechanism with the input shaft releasably.

* * * * *